United States Patent [19]

Gursahaney et al.

[11] Patent Number: 5,097,528
[45] Date of Patent: Mar. 17, 1992

[54] SYSTEM FOR INTEGRATING TELEPHONY DATA WITH DATA PROCESSING SYSTEMS

[75] Inventors: Suresh K. Gursahaney, Gaithersburg, Md.; Daniel J. Helm, McLean, Va.; Dana R. Lee, Laurel, Md.; Richard J. Madrid, Gaithersburg, Md.; Valerie S. McKenzie, Germantown, Md.; Miller Steven K., Germantown, Md.

[73] Assignee: International Business Machines Corporation, Armonk, N.Y.

[21] Appl. No.: 660,763

[22] Filed: Feb. 25, 1991

[51] Int. Cl.⁵ .................... H04M 1/57; H04M 1/64; H04M 3/50
[52] U.S. Cl. ......................... 379/67; 379/92; 379/142; 379/201; 379/267; 379/308
[58] Field of Search ............... 379/142, 201, 246, 247, 379/308, 265, 267, 67, 88, 92, 216

[56] References Cited

U.S. PATENT DOCUMENTS

| | | |
|---|---|---|
| 3,989,899 | 11/1976 | Norwich . |
| 4,320,256 | 3/1982 | Freeman . |
| 4,406,925 | 9/1983 | Jordan et al. . |
| 4,438,296 | 3/1984 | Smith . |
| 4,451,700 | 5/1984 | Kempner et al. . |
| 4,599,493 | 7/1986 | Cave . |
| 4,797,911 | 1/1989 | Szlam et al. ............ 379/67 |
| 4,894,857 | 1/1990 | Szlam et al. ............ 379/67 |
| 5,036,535 | 7/1991 | Gechter et al. ......... 379/201 X |

Primary Examiner—Stafford D. Schreyer
Attorney, Agent, or Firm—John E. Hoel

[57] ABSTRACT

A system is disclosed for providing an automatic interface between a host based, menu driven application program and a telephone network. The system includes a host access table stored in a memory in the workstation, containing operational commands. An interface program stored in the workstation memory executes the commands in the host access table, to perform interfacing functions between the host application program and the telephone network.

65 Claims, 21 Drawing Sheets

```
DATA BASE                                    R1
RESPONSE MENU

CUSTOMER
NAME        [                              ]

STREET
ADDRESS     [                              ]

CITY /
STATE       [                    ]   [    ]

PURCHASE
HISTORY     [                              ]
            [                              ]
            [                              ]
            [                              ]

KEY

ESC = MAIN MENU
```

FIG. 13

```
HELP MENU - DATABASE                         H1
  ___
  ___
  ___

KEY

F4 = MAIN MENU
```

FIG. 14

| SCREEN IDENTIFIER "CHARS" | LOCATION | STEP 1 | STEP 2 | STEP 3 | STEP 4 |
|---|---|---|---|---|---|
| "Q1" | ROW=1, COL=78 | END | | | |
| "M1" | ROW=1, COL=78 | [F2] | END | | |
| "H1" | ROW=1, COL=78 | [F4] | [F2] | END | |
| "R1" | ROW=1, COL=78 | [ESC] | [F2] | END | |

*FIG. 15*

| SCREEN IDENTIFIER "CHARS" | LOCATION | STEP 1 | STEP 2 | STEP 3 | STEP 4 |
|---|---|---|---|---|---|
| "O1" | ROW=1, COL=78 | END | | | |
| "O2" | ROW=1, COL=78 | [ESC] | END | | |
| "O3" | ROW=1, COL=78 | [ESC] | END | | |
| "O4" | ROW=1, COL=78 | [ESC] | END] | | |

*FIG. 18*

```
ORDER MENU                          01

TYPE:

CUSTOMER
NAME       [                              ]

STREET     [                              ]

CITY /
STATE      [                    ]    [    ]

QUAN    ITEM NO. / DESCR.
[    ]  [                              ]
[    ]  [                              ]
[    ]  [                              ]

PRESS [ENTER]        F1 = HELP
TO SEND ORDER        F2 = INVENTORY
```

*FIG. 17*

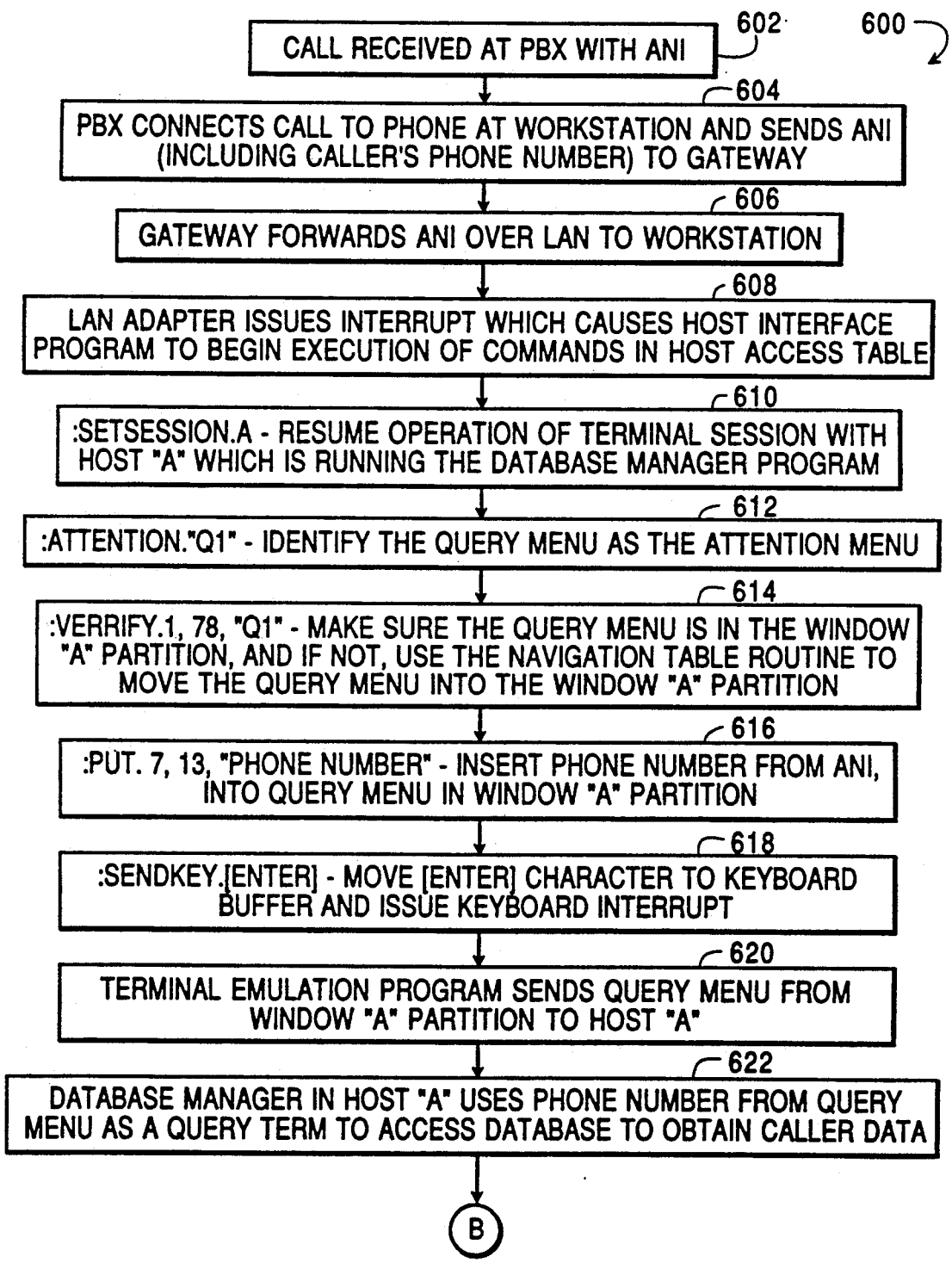

```
:* HOST ACCESS TABLE FOR TELEPHONE ORDER ENTRY         132
:*
:* USES CALLER DATABASE MANAGER ON TERMINAL SESSION "A"
:* AND ORDER ENTRY PROGRAM ON TERMINAL SESSION "B"
:*
:TABLE.TELEPHONE_ORDER

:SETSESSION.A

:ASSIGN.ATTENTION, "Q1"

:VERIFY.1, 78, "Q1"

:PUT.7,13, "PHONE NUMBER"

:SENDKEY.[ENTER]

:VERIFY.1,78, "R1"

:GET.7,40,30, "NAME"

:GET.10,40,30, "STREET ADDRESS"

:GET.13,40,30, "CITY STATE"

:MESSAGE. "SELECT ORDER ENTRY [ALT+O], OR HANG-UP [ALT+H]

:USER_PROMPT

:SETSESSION.B

:ASSIGN.ATTENTION, "O1"

:VERIFY.1, 78, "O1"

:PUT.7,40, "NAME"

:PUT.9,40, "STREET ADDRESS"

:PUT.11,40, "CITY STATE"

:MESSAGE. "SELECT EXECUTE ORDER [ALT+E], OR HANG-UP [ALT+H]"

:USER_PROMPT

:SENDKEY.[ENTER]

:ENDTABLE.TELEPHONE_ORDER
```

*FIG. 27*

SYSTEM FOR INTEGRATING TELEPHONY DATA WITH DATA PROCESSING SYSTEMS

BACKGROUND OF THE INVENTION

1. Technical Field

The invention disclosed broadly relates to data processing systems and more particularly relates to the integration of telephony information in a data processing system.

2. Background Art

Today's competitive business environment has increased the importance of customer service. In many industries, the best company is determined by the service it provides its customers. In many cases, the primary interface the customer has with the company is the telephone. Depending on the business, the customer's calls are serviced by some type of call center. The call center could be a help desk, customer service, telephone sales or claims.

Recent advances in telephony technology have created an opportunity for improvements in call center operations. Until now, call center employees would answer the telephone and, based on information provided by the caller, access an application on a host computer. With these telephony advances, information about an incoming call is now provided by the Central Office to the company's private branch exchanges (PBX). This information about an incoming call can be used to automatically access host applications to obtain a customer profile.

What is needed is an easy technique for a call center to customize its call center functions, without requiring the reprogramming of the host computer.

OBJECTS OF THE INVENTION

It is therefore an object of the invention to provide a flexible technique for customizing call center functions without requiring the reprogramming of a host computer serving the call center.

It is still another object of the invention to provide a means for customizing call center operations, which can be implemented by persons of limited skill in the computer arts.

SUMMARY OF THE INVENTION

These and other objects, features and advantages are accomplished by the invention disclosed herein. The invention is a subsystem for providing a programmable interface between a host based application program and a telephone network to automatically transfer operands derived from caller identification data from the telephone network to the host application program. The invention is applied in a system including a workstation coupled to a telephone network for receiving caller identification data and coupled to a host computer running a menu driven host application program which exchanges menu images with the workstation, the menus containing fields for buffering operands to be processed by the host application program, the operands derived from the caller identification data.

The invention includes a host access table stored in a memory in the workstation, containing operational commands. An interface program stored in the workstation memory executes the commands in the host access table, to perform interfacing functions between the host application program and the telephone network.

A first window partition is in the workstation memory for buffering communicated menu images transmitted from the host application program. A verify means is in the interface program for checking the identity of a first menu buffered in the first window, in response to a verify command in the host access table. A put data means is in the interface program for inserting an operand derived from the caller identification data received from the telephone network into a predefined location in the first menu buffered in the first window, in response to a put command in the host access table. A sendkey means is in the interface program for generating a keystroke which transmits to the host computer at least a portion of the first menu from the first window, in response to a sendkey command in the host access table.

The first window in the workstation memory receives a second menu communicated from the host application program in the host computer, including response data in a predefined location in the second menu which is responsive to the operand derived from the caller identification data. A get data means is in the interface program for extracting the response data at the predefined location in the second menu in the first window, in response to a get command in the host access table. In this manner, a programmable interface is provided between the host based application program and the telephone network to automatically transfer operands from the telephone network to the host application program.

Another feature of the invention is the provision for the verify means in the interface program to check that the identity of a first menu buffered in the first window is that of a predefined menu, in response to a verify command in the host access table. A navigation table is stored in said memory in the workstation, containing a sequence of selection key indicators for a sequence of selection keys which the host application program requires to move from the first menu to the predefined menu. A menu navigation means is included in the interface program for moving the predefined menu into the first window, using the sequence of selection key indicators in the navigation table.

Another feature of the invention is the provision for a programmable interface between two host application programs and the telephone network. The invention enables the first host based application program and the telephone network to automatically transfer operands from the telephone network to the first host application program and between the first host application program and the second host application program.

BRIEF DESCRIPTION OF THE DRAWINGS

The invention disclosed herein will be more fully appreciated with reference to the accompanying figures.

FIG. 13 shows the data base response menu for the data base manager program.

FIG. 14 shows the help menu for the data base manager program.

FIG. 15 shows the navigation table for session A for the data base manager program.

FIG. 17 shows the order menu for the order entry program.

FIG. 18 shows the navigation table for the session B for the order entry program.

FIG. 26A, 26B, and 26C shows the flow diagram for a telephone order entry application using two terminal sessions in conjunction with the architecture shown in FIG. 5.

FIG. 27 shows the host access table for the telephone order entry application described in FIG. 26.

DISCUSSION OF THE PREFERRED EMBODIMENT

Figure 1:
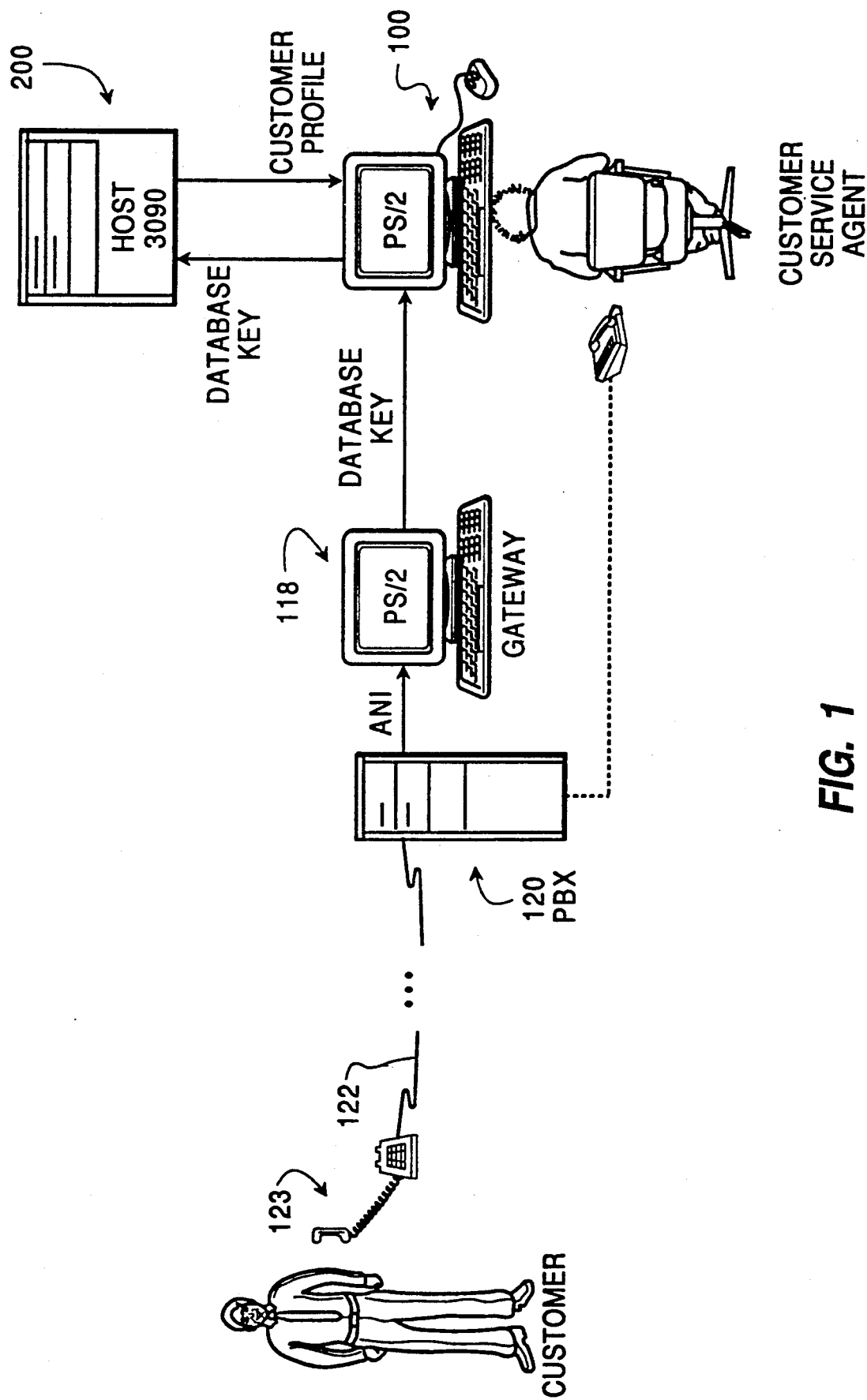
FIG. 1 is a block diagram of the system organization of the invention.
Figure 2:
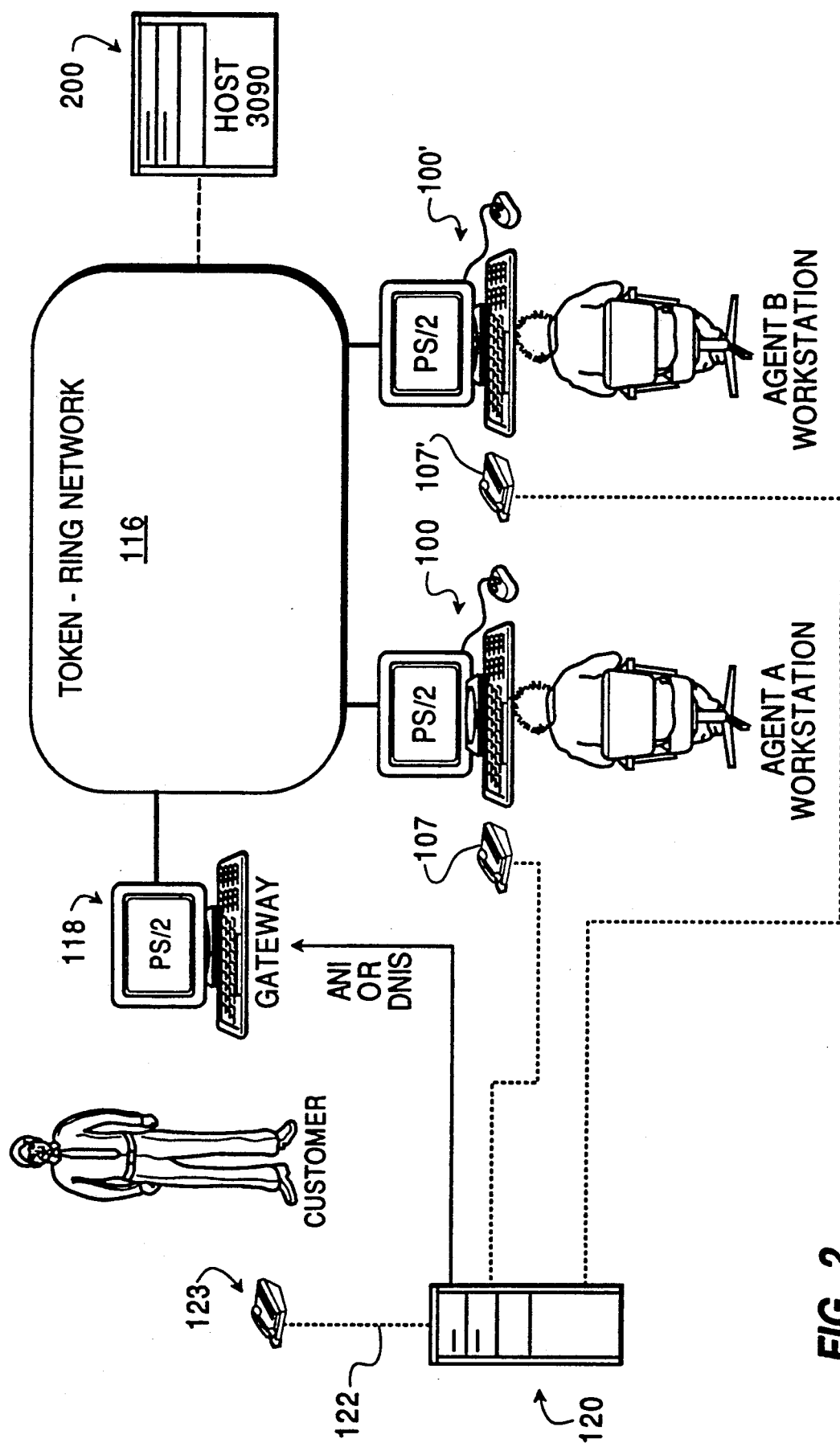
FIG. 2 is a functional block diagram of the invention when embodied using a token ring network and a plurality of workstations in a customer service application.

The invention is a programmable interface between a host based application program and a telephone network to automatically transfer operands derived from caller identification data from the telephone network to the host application program. The interface is highly flexible enabling the implementation of a variety of teleservicing applications without the reprogramming of the host application program. The system includes a host interface program which is a menu driven program which enhances existing telephone support systems. Typically, call centers are staffed with service representatives who answer the telephone and access one or more host applications to respond to a customer's request. Reference can be made to FIG. 1 which shows an architectural diagram of a telephone servicing data processing center, in accordance with the invention. An interactive, menu driven programmable interface is provided in the workstation 100 to enhance an existing telephone support system and an existing applications program in the host computer 200. Typically, the invention will improve call center servicing by reducing the amount of information that must be provided verbally by the customer to the service representative, thus reducing the time required to service a given caller. Service time is reduced by using data obtained about the call from the telephone system 122. This data can include an automatic number identification (ANI), where the calling party's billing number is passed to the company's private branch exchange (PBX) 120. For example, the customer's telephone number (ANI) can be used as a key for a data base access to a data base manager running on the host computer 200, thereby reducing the time required to perform customer identification. Service is also improved by providing coordinated voice/data transfer if it is necessary to transfer the customer to a second service representative, in a system such as is shown in FIG. 2. This passing of data to a new service representative, along with voice, eliminates the need for the customer to repeat the information. The significant improvement in customer service translates into better customer relations and improves service representative morale, yielding a more cost effective call center operation with greater service representative availability.

The system shown in FIG. 2 includes a gateway 118 and one or more workstation components 100 connected by a token ring local area network (LAN) 116. The organization of the system with several workstations 100 and 100' connected to the local area network 116 is shown in FIG. 2. The gateway 118 interfaces with the company's PBX 120 to obtain information on the incoming call (for example the ANI) and passes that information via the token ring LAN 116 to a service representative's workstation 100. The workstation 100, under program control, automatically accesses host applications running on the host 200, to provide caller-specific information to the service representative.

The workstation 100 provides functions such that existing host applications running on the host 200 do not require modification. In certain cases, if a host application does not provide access to its data base by using a phone number as a query term, a modification may be required. Workstation operations are controlled through the use of a host access table (HAT) 132 shown in the architectural diagram of FIG. 6. The HAT is a file containing a series of commands that instruct the host interface program 138, also shown in FIG. 6, how to interact with the host application running on the host computer 200. The HAT is built by the system administrator for the user to employ with a specific host application. The HAT can be personalized, so that each representative can have operations customized to the specific types of calls handled by his workstation 100.

Figure 3:
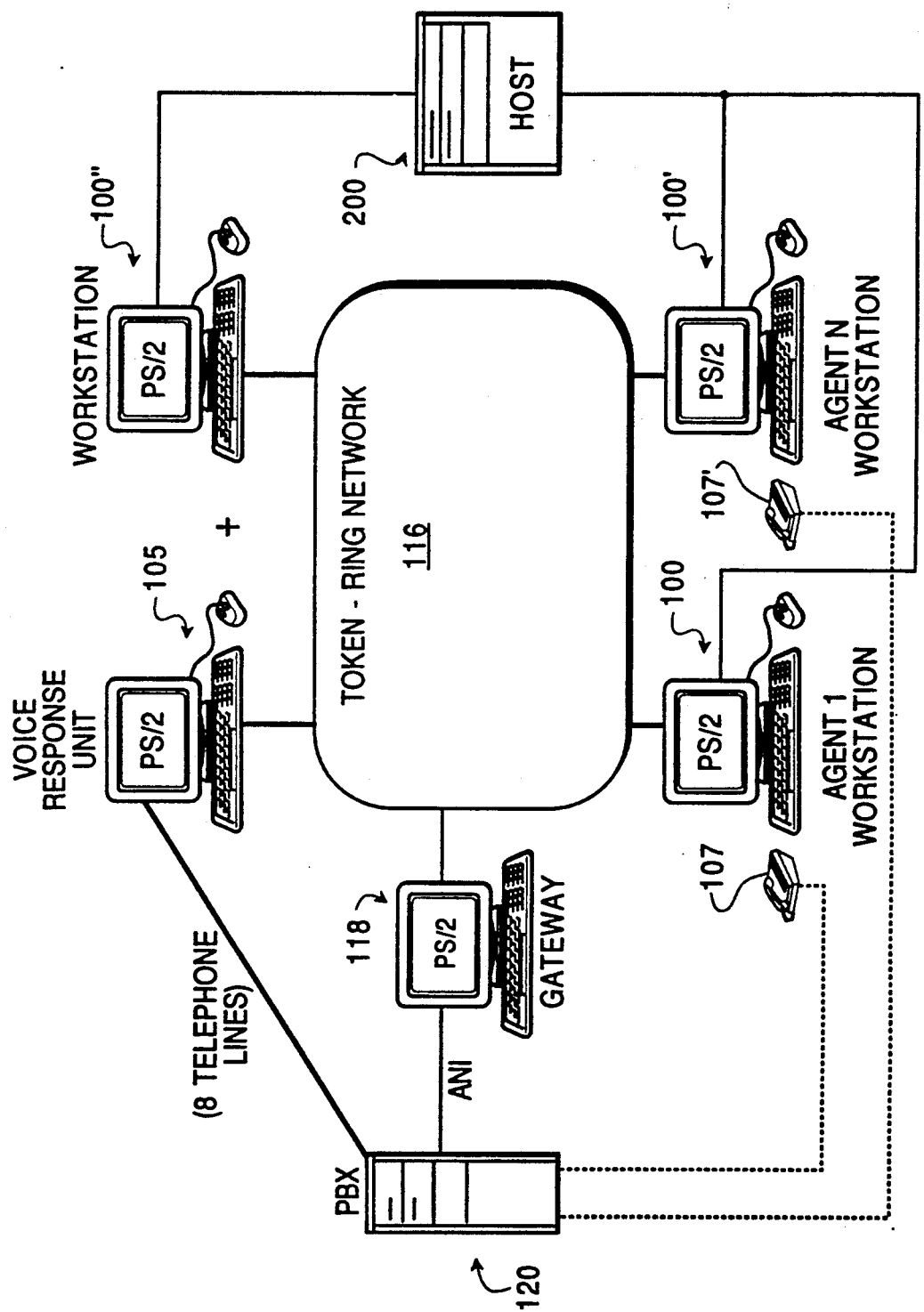
FIG. 3 is a block diagram of the invention when embodied as a token ring network in an automated answering application.

FIG. 3 shows an embodiment of the invention when it is applied to an automated answering application such as a power outage reporting system. The customer in the public telephone network will telephone into the PBX 120 to report a power outage at the customer's residence where his telephone is located. The PBX 120 will transmit the automatic number identification data for the customer's phone through the gateway 118 and over the local area network 116 to the unmanned workstation 100" and the PBX 120 will also connect the customer's voice line to the voice response unit 105. the workstation 100", which is under the control of a HAT 132 therein, accesses the host computer 200 which is running a power outage inventory management program which keeps track of currently active utility repair projects. The workstation 100" obtains from the host computer 200 data concerning the current status of repair activities for the power system supplying the customer's residence. The unmanned workstation 100", under control of HAT 132 therein, transmits the customer's repair status information over LAN 116 to the voice response unit 105. The voice response unit then reports the status to the customer through the PBX 120. If the customer wants to speak to an agent, he presses a DTMF key. The voice response unit then signals the workstation 100" to initiate a transfer of the customer's voice line and the accessed repair status data to the manned workstation 100.

Figure 4:
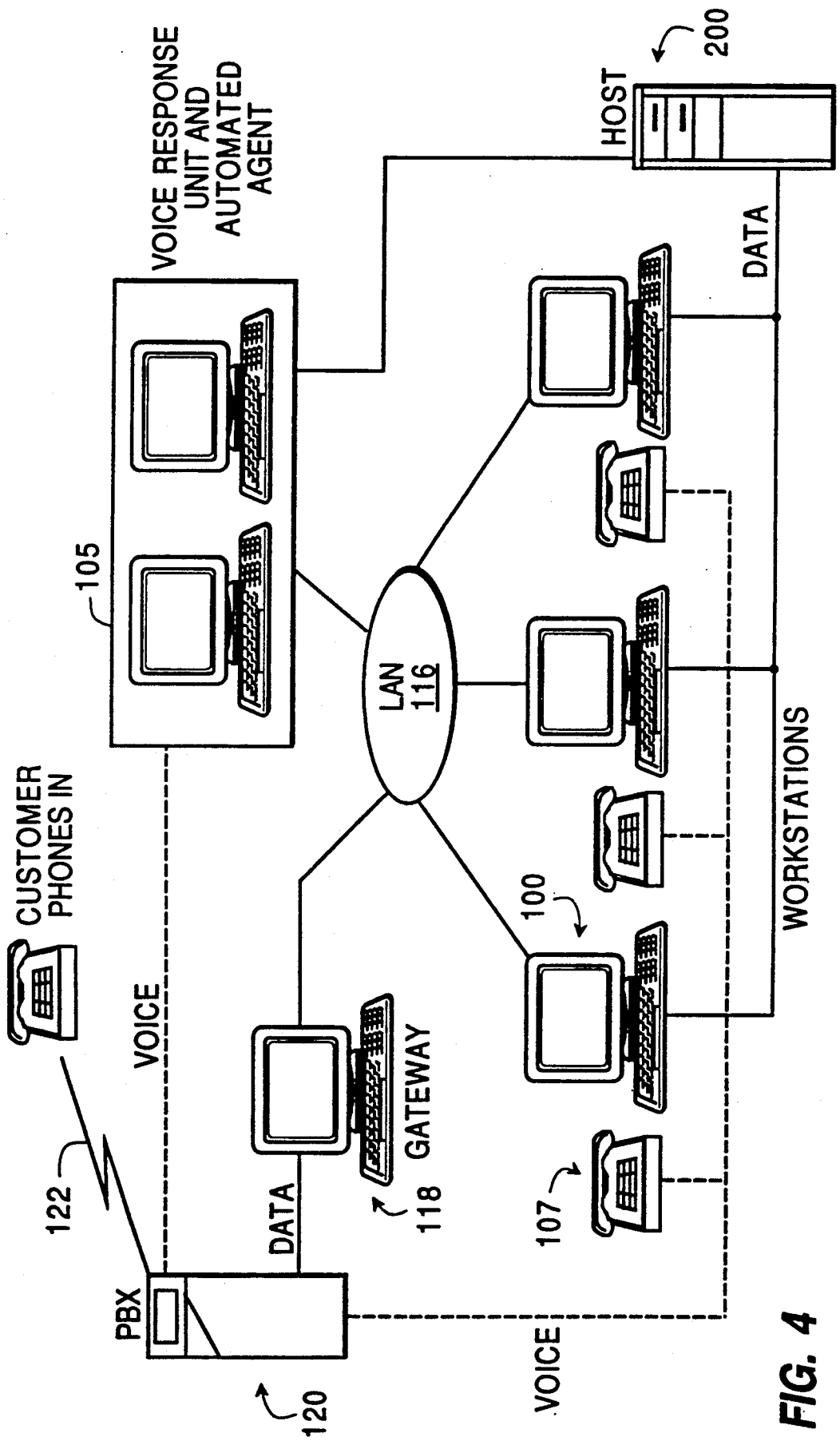
FIG. 4 is a block diagram of the architectural embodiment of the invention, which includes a voice response unit.

Caller specific information can also be obtained through the use of an optional voice response unit (VRU) 105 shown in FIG. 4. The VRU 105 answers the call and collects the customer information necessary to process the call. The VRU 105 communicates with the workstation 100 through a device driver. Once the data is collected from the caller, the VRU 105 can instruct the workstation 100 to update the customer data on the host 200. If interaction with the service representative is required, the call and the VRU-obtained data can be transferred to a service representative. The representative's workstation 100 can then access the host applications running on the host 200, based on the data obtained by the VRU 105.

Since the objective of the host interface program 138 is to improve agent productivity for existing applications running on the host 200, there are no functions in the host interface program 138 which would impair call center operations in the unlikely event that the system were to fail. Calls can still be accepted and the host data base accesses to the host 200 performed, however, in this case, the service representative must use the original manual method.

The host interface program 138 provides a software system that can be installed incrementally, beginning with the gateway 118 and a limited number of workstation components 100 and 100', with a low initial investment. The system can expand as service is provided to additional representatives and as more customer applications are added.

In addition, the system incorporates an architecture which enables additional software to be added to support other voice/data functions. These functions may be resident on the workstation 100, the gateway 118, or other components connected in the system. The communication between these components is over the local area network.

The workstation 100 and the gateway 118 use IBM's System Application Architecture (SAA) in an Operating System/2 Extended Edition (OS/2 EE) environment. Operating System/2, OS/2 and System Application Architecture are trademarks of the International Business Machines Corporation. The gateway 118 and the workstation 100 components employ the OS/2 Extended Edition presentation manager and they conform to the IBM SAA Common User Access (CUA) guidelines.

The OS/2 EE Communications Manager token ring LAN NETBIOS programming interface is used to provide communications between the gateway 118 and the workstation 100 components. The gateway also uses the OS/2 EE Communications Manager X.25 Application Programming Interface (API) for communications with the PBX 120.

Figure 5:
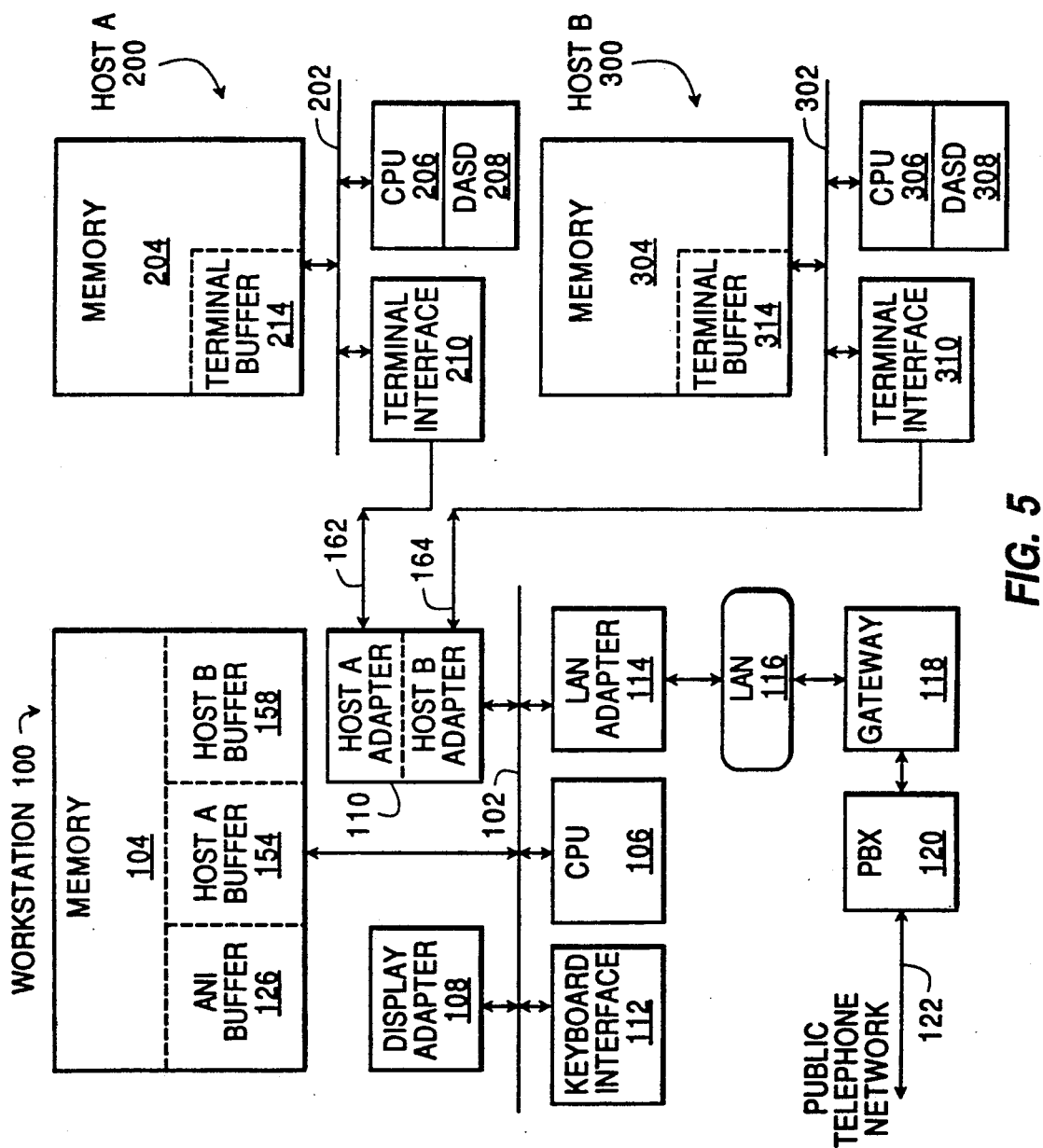
FIG. 5 is an architectural diagram of the workstation selectively conducting two terminal sessions with two host computers in a telephone order entry application.

The OS/2 EE Communications Manager is also used by the workstation 100 to permit host communications with the host 200. Multiple sessions with the given host 200 or multiple hosts 200 and 300, as is shown in FIG. 5, can be accessed concurrently according to OS/2 EE Communications Manager capabilities. The host interface program 138 emulates keystrokes to access and retrieve data from IBM System/370 host applications, AS/400 host applications and System 36 applications. System/370, AS/400 and System 36 are trademarks of International Business Machines Corporation.

A significant feature of the host interface program 138 is that it can be used in conjunction with existing host applications running on the host 200, and generally does not require modification of the existing host application running on the host 200. The host interface program 138 is a passive system which does not interfere with host applications running on the host 200, and does not interfere with the entering of data in the host screen. It does not remove control from the service representative if the host interface program 138 is not running.

For those systems which do not use a telephone number as a data base key for the data base manager running on the host 200, a voice response unit 105 can be used to request the correct account number from the customer. The account number can then be used in the same manner as a telephone number to identify and retrieve data using the host interface program 138.

The gateway 118 performs several major functions. It communicates with the PBX 120. The gateway 118 receives data, such as automatic number identification (ANI) and dialed number identification service (DNIS) from the PBX 120 when a call is received from the public telephone network 122. The gateway 118 will send data from the PBX 120 to the service representative workstations 100 and 100' via the local area network 116. The gateway 118 will receive transfer and conferencing requests from service representative workstations 100 and 100' and will send messages to the PBX 120 to request the voice transfer. The gateway 118 coordinates the transfer and conferencing of data until a destination agent has been identified on a "blind transfer." The gateway 118 will provide backup and recovery in a hot stand-by support which depends upon the switching capabilities of the PBX 120. The gateway 18 will perform start-up and shut-down operations upon request from the system administrator. Multiple gateways 118 which communicate with the same PBX 120, can be installed for performance requirements.

The host interface program 138 and the gateway 118 will support conventional PBX types 120, such as the Northern Telecom Meridian 1 PBX with the Meridian Link module; (Meridian is a trademark of Northern Telecom). They will also support the AT&T DEFINITY G1, DEFINITY G2, or System 85 PBX with the AT&T ISDN gateway (IG); (DEFINITY is a trademark of the American Telephone and Telegraph Corporation).

The host interface program 138 will provide a screen at the workstation 100 which is used by a service representative to receive calls, transfer calls, set up conference calls, and automate host functions.

Upon receiving data from the gateway 118 on an incoming call, the host interface program 138 uses this data to access customer information stored in the host data base on the host computer 200. This customer information is automatically displayed at the workstation 100 on or before the time that the telephone 107 at the workstation 100 actually rings. These workstation operations to access the host computer 200 are controlled through the use of host access tables (HATs) 132.

A HAT 132 contains instructions or commands that specify the actions that are performed on the host session between the workstation 100 and the host computer 200. For example, when a telephone call is received at a workstation telephone 107, the workstation receives the calling phone number from the gateway 118. A table in the workstation HAT 132 defines a procedure that passes this number to the host session on the host computer 200, enters the data in the proper field, and moves through the host application screens to the one screen that contains the information the representative needs to display at the workstation 100. In this manner, the customer information screen is automatically displayed to the service representative at the workstation 100 as the telephone 107 is ringing at the representative's desk. Moreover, no modifications to the host applications running on the host computer 200 are required to perform this interaction.

Several host access tables 132 can be developed to access a variety of host applications running on the host computer 200. An option is provided to the service representative to change a current HAT 132, dynamically.

An important function provided by the host interface program 138 and the gateway 118 is the ability of the service representative to transfer calls to another service representative, while simultaneously transferring data to access the customer's profile on the host computer 200. In addition, the service representative can send a copy of the host screen, on which the representative is working, to the new service representative. This is frequently referred to as a coordinated voice/data transfer, with the data transfer providing the identification of the caller to the new service representative. The first service representative can consult with the new service representative before connecting the customer. A transfer call pop-up window may be used for making transfer call selections.

Another capability of the system is to conduct conference calls with other service representatives. Service representatives included in the conference call will have the customer's profile at their workstation. The originating service representative may also send a copy of the host screen concurrently being displayed on their workstation. They can also carry on a conversation with one another before including the customer in the conference call. With this system, the service representative can set up a conference call simply by selecting a conference call function on the workstation 100. In this way, as many representatives as desired may be included in the call. A conference call pop-up window may be used for making conference call selections.

The system provides preprogrammed key combinations called quick keys, to automate the functions at the workstation 100. The quick keys are key combinations that are used together to provide a shortcut in performing a task on the host computer 200. The quick keys enable the service representative to quickly enter data on host screens. For example, if the caller wanted something ordered, the service representative might use one of the quick keys combinations, such as alt+1, key combination, to perform the information management system (IMS) set of operations running on the host computer 200, of typing data from one host screen to another that result in an order being executed. The quick keys are set by the system administrator. The quick keys menu selections can be shown on a screen at the workstation 100. Examples of quick keys are "alt+0" to prepare a data base for a query; "alt+4" to initiate an account search, for example.

As is shown in FIG. 4, the system can be configured to operate with a voice response unit 105 to provide an automated service representative function. The VRU 105 communicates as the voice of the service representative, and the host interface program 138 in conjunction with the host access table 132 at the workstation 100, emulates the service representative's keystrokes in requesting and retrieving data from the host computer 200. The VRU 105 can be used for directing calls, requesting responses from the caller, accepting tone dialing responses, accepting voice limited responses, and providing automated service representative services.

A VRU 105 can be set up to retrieve customer telephone information in areas where ANI is not available to provide the customer's ANI or account number to the system.

The VRU 105 can direct calls by answering the customer's calls and obtaining additional information from either tone based signals or through limited verbal responses, such as yes and no. This data is used to direct the call to a specific service representative and to retrieve data from the host application running on the host computer 200.

HOST ACCESS TABLES

Interaction between the workstation 100 and the host computer 200 is controlled by statements within the host access table (HAT) 132. These statements define the actions that are taken when a call is received and when the preprogrammed quick keys are used.

The HAT 132 is run each time a phone call is received or when the service representative uses certain preprogrammed quick key combinations.

For example, when a telephone call is received by a service representative, the workstation 100 receives the caller's data such as an ANI and DNIS information from the gateway 118. A part of the workstation HAT 132 defines the procedure that allows the ANI to be passed, for example, to the host session running on the host computer 200. It enters the ANI into the proper field for a menu displayed on the screen at the workstation 100, and navigates through the host application screens to the one that contains the information the representative needs to have displayed at the workstation 100.

The HAT 132 also contains a table that defines the preprogrammed quick keys. The quick keys are key combinations used to perform shortcuts in performing certain functions. The quick key actions reside in tables called quick key tables. The quick key tables are used to set up key combinations to perform specific actions in a host application.

For example, the representative or system administrator could set the key combination of "alt+0" to move to a specific screen in the host application running on the host computer 200, and perform a keyboard function such as the depression of a PF2 key. Multiple HATs 132 can be defined and the service representative can dynamically choose which HAT 132 is to be used at any moment.

The table language used to construct the host access table 132 consists of a control word and appropriate parameters. There are two types of control words. The first type is a meta control word which performs a function general to the entire table. A meta control word is executed by the table compiler. A second type of control word is the command, which performs a specific function in the table. Command control words are executed during operation of the HAT 132. Control words and their syntax are described in the following discussion.

An ASCII editor can be used to write the host access table 132. Once the HAT 132 has been written, it should be compiled with the table compiler. Compiling converts the tables to a form that the host interface program 138 can execute. As an alternative, the host interface program 138 can be embodied as an interpretive program which will interpret the command words in the host access table 132 at the time of execution.

Data can be passed back and forth between the workstation 100 and the host application running on the host computer 200 through the execution of the commands in the host access table 132. Four types of data can be passed to and from the host session, system variables, user variables, keystrokes and fixed data.

System variables contain text strings provided by the host interface program 138, that can be used in host applications running on the host computer 200. Examples of four system variables are as follows. The variable "%0" provides the telephone line number of an incoming call. This variable identifies to which of 16 lines coming out of the PBX 120 the data applies. The value of this variable can be from one to 16. The second system variable is "%1" which is the ANI or other caller identification data. This can be 10 digits for outside calls or four or five digits for internal calls. Another system variable is "%2" which is the dialed number information service (DNIS) number that the customer called. Another system variable is "%3" which is the service representative extension to which an incoming call has been routed by the automatic call distribution function of the PBX 120. Still another system variable is "%4" which identifies the extension which initiated a transfer or conference call. Other system variables can also be set forth.

User variables are variables that can be used by the user to capture text strings from one host screen and place them on another Up to 10 text strings of 80 characters can be held at one time and user variables identify "#0" to "#9." User variables can also be used to manipulate data from system variables or fixed data.

Keystrokes are used to initiate actions in a host session. The host access table 132 can initiate actions in a host session by passing a simulated keystroke. These are normally special keystrokes, such as a program function key (PF) or an enter key.

Fixed data can be specified by a specific text string which can be placed on host screens. The maximum length for such text screens is 99 characters. Text strings can contain system variables or user variables, which can be replaced with the proper values before the command is executed.

The host access table 132 contains a series of tables, and each table defines a separate set of actions. The actions that are to be performed by a table are specified in a statement. The statements control the actions to be taken and pass data to the host 200. By defining the appropriate sequence of statements, the user can pass the data to the host session, enter it in a field on a host application screen, and initiate host application actions. Each action is a statement in the host access table 132. A statement consists of a control word and an operand. Its syntax is "control word.operand."

A command control word is used within a host access table to perform an action. A statement starts with a control word. A control word can be anywhere on a line and may be expressed in uppercase, lowercase or mixed case. When a statement is written, a period must be used to separate the control word and the operand. For example: ":GET.1,6,3,#7."

The command control words, also referred to as commands, are used to send actions to the host session on the host computer 200. They begin with a colon ":" and can start anywhere on the line. However, the entire statement must be complete on one line in the host access table.

The operand may be a constant or a text string depending upon what is appropriate for the control word. All operands must be on one line and separated by commas. Text strings may be enclosed in quotation marks. For commands requiring text strings, the text string may contain system and user variables that are substituted when the host access table 132 is being executed by the host interface program 138. For example, the string "The ANI is %1" will substitute the automatic number identifier for "%1."

Meta control words are table compiler control words which perform general functions for an entire table and are implemented at the time of compiling a host access table. Such things as comment statements, embedding a file, and printing a compile message are typical compiler control words.

COMMAND CONTROL WORDS

An example of command control words used to construct a host access table 132 are given in the following discussion.

The command control word ":ASSIGN" assigns a value to a variable. For example, ":ASSIGN.#6,Phone Number=%1" will perform a function at the time of the execution of the host access table 132 by the host interface program 138. The function performed will be assigning the value of the variable "#6," the string "Phone Number=" and the current value associated with the system variable "%1" which is the ANI caller identification data.

The command control word ":COMPARE" can be used to compare the value of a variable to determine that it contains a specified text string. For example the expression ":COMPARE.#4,New Account" will be executed when the host access table 132 is executed by the host interface program 138. The function performed is to compare the value of the variable "#4" which has been taken from a host screen for example, and checked to see if it is the string "New Account." This comparison can be used to determine whether the customer's account was new.

The command control word ":IF" can be used to alter the flow of control of the operation of a host access table. In general, this command is used after a ":COMPARE" command, however it is not limited to this.

The command control word ":ENDIF" can be used with the ":IF" command to end an IF statement. When the condition for the ":IF" is true, the statements following the ":IF" command are executed, otherwise the instructions are branched around until after the ":ENDIF" command.

The command control word ":GET" can be used to get a string from the host screen displayed at the workstation 100, and assign it to a user variable. The user variable can be used later in other commands. An example is ":GET.12,10,20,#4." In this example, when the host access table 132 containing the ":GET" command is executed by the host interface program 138, the host interface program 138 will read 20 characters of text beginning in column 10 of row 12 of the active host screen being displayed in the workstation 100 window and will assign it to the user variable "#4." One can use the variable in a ":PUT" command to place the text somewhere else on the current or another screen.

The command control word ":GOTO" can be used to cause the flow of control to unconditionally change to a specified label.

The command control word ":MESSAGE" can be used to place a message in the message area on the workstation 100 main window.

The command control word ":PUT" can be used to place a string in a field on the active host screen being displayed in the current window of the workstation 100. The active screen is set by the ":SETSESSION" command. An example is ":PUT.11,23, Phone Number for #1 is %1." In this example, the string "Phone number for Joe is 3015551212" is placed in a field that begins in row 11, column 23 on the current host screen. In this example, the user variable "#1" was previously set to "Joe" and the system variable "%1" contained the phone number "3015551212."

The command control word ":QUICKKEY" is used to begin a table that specifies the actions to be taken when a service representative uses one of the quick keys. The ":ENDQUICKKEY" command ends the table.

The command control word ":SENDKEY" can be used to send a simulated keystroke to the active host screen. Before using this command in the table, a session must be set in the table with the ":SETSESSION" command. Examples of valid key names which can be used with the ":SENDKEY" command include "ENTER," any of the program function keys, for example "PF1," etc. As an example, ":SENDKEY.ENTER" will cause the host interface program 138 to send a simulated enter keystroke to the keyboard buffer 136.

The command control word ":SETSESSION" is used to specify the host session that the host table will use. It is assumed that the host session is configured and logged on when the host access table is run. As an example, ":SETSESSION.B" will set the active session B for the host access table 132. Sessions can be selectively reset during the execution of a host access table.

The command control word ":USER PROMPT" is used to pause execution of the host access table 132 by the host interface program 138 to allow the user to enter data. The user can then use a key combination such as a "Ctrl+R" to resume the execution of the HAT. An example would be ":MESSAGE.Enter report number and then Ctrl+R to resume" followed by the command control word ":USER_PROMPT." In this example, the host interface program 138 places the message in the workstation 100 window and waits for the user to enter a report number in the host session and to use the "Ctrl+R" combination to continue.

The command control word ":VERIFY" can be used to check that the proper host screen is present in the current window partition for the workstation 100. The ":VERIFY" command verifies that a value which is specified is on the current displayed host screen. If the value is not on the screen, a message can be displayed and the system will wait until the user either gets to the correct screen and presses the resume key combination to resume the host access table execution, or presses a halt key combination to bypass the rest of the host access table. Alternately, the ":VERIFY" command can branch to a menu navigation program if the specified value is not on the screen, in order to automatically navigate to a desired screen which will have the specified value thereon. An example is ":VERIFY.2,5,SCR10022." In this example, the host interface program 138 checks that the screen number "SCR10022" is in row 2, column 5 on the current displayed host screen at the workstation 100.

HOST ACCESS TABLE EXAMPLE

Table 1 provides an example of a host access table used to support a help desk application. This example shows how fixed data is entered and how the ANI number is placed on a particular host screen. It then shows how the enter key is simulated.

When the enter key is simulated, it causes a host screen to appear at the workstation which allows the service representative to select data therefrom. After the selection is made, another host screen appears that data is taken from and converted into user variables. The enter key is then simulated and the data is taken from another screen. Keystrokes are then entered by the system to get the host computer 200 to present a problem entry screen where the data that has been collected may be placed. An example of a quick key definition is also shown. In the Table 1, reference lines "REF" are provided as the cross-reference to the line numbers below. The line numbers provided below provide an explanation for each line or group of lines in Table 1.

| Example of Host Access Table | |
|---|---|
| REF | HAT Statements |
| 1 | .* |
| 2 | .* PRIMARY TABLE FOR HELPDESK |
| 3 | .* |
| 4 | :TABLE.PRIMARY |
| 5 | .* |
| 6 | .ms this is the PRIMARY table for help desk operation |
| 7 | :MESSAGE.HELP DESK - incoming call being processed |
| 8 | .* |
| 9 | .* Set host screen to A screen |
| 10 | :SETSESSION.A |
| 11 | .* |
| 12 | .* Position to top level menu, verify panel |
| 13 | .* |
| 14 | :VERIFY.03,02,BLG0EN20 |
| 15 | .* Submit query |
| 16 | .* Phone number can be 4 or 7 digits, |
| 17 | insert a dash-line if it is 7 |
| 18 | :ASSIGN. #0, %1 |
| 19 | :INSERT_CHAR. #0,4,EQ,7,- |

Example of Host Access Table -continued

| REF | HAT Statements |
|---|---|
| 20 | :PUT.1,7,"13,8,#0,2,VID/PCS/PRT,90" |
| 21 | :SENDKEY.ENTER |
| 22 | .* |
| 23 | .* Allow user to enter device record that is of interest |
| 24 | .* |
| 25 | :VERIFY.03,02,NEU1THWR |
| 26 | :MESSAGE.Select Rep., ALT-H to halt, ALT-R to resume |
| 27 | :USER_PROMPT. |
| 28 | :SENDKEY.ENTER |
| 29 | .* |
| 30 | .* Get profile information from panel |
| 31 | .* |
| 32 | :VERIFY.03,02,BLG0N100 |
| 33 | .* location |
| 34 | :GET.7,27,4,#1 |
| 35 | .* Serial Number |
| 36 | :GET.8,27,16,#2 |
| 37 | .* Go to communication panel |
| 38 | :PUT.1,7,"2" |
| 39 | :SENDKEY.ENTER |
| 40 | .* |
| 41 | .* Get more fields from communication panel |
| 42 | .* |
| 43 | .* Device type, location |
| 44 | .* |
| 45 | :VERIFY.03,02,NEU0N150 |
| 46 | .* Device type |
| 47 | :GET.9,28,10,#3 |
| 48 | .* IBM Node Name |
| 49 | :GET.10,69,8,#4 |
| 50 | .* Contact Name |
| 51 | :GET.16,28,25,#5 |
| 52 | .* |
| 53 | .* Position to top level menu |
| 54 | .* |
| 55 | .* |
| 56 | |
| 57 | .* Problem Entry |
| 58 | .* |
| 59 | :PUT.1,7,:init,10 |
| 60 | :SENDKEY.ENTER |
| 61 | .* |
| 62 | .* Problem report entry panel |
| 63 | .* |
| 64 | :VERIFY.03,02,BLG0B100 |
| 65 | .* Report Name |
| 66 | :PUT.8.27,#5 |
| 67 | .* Location |
| 68 | :PUT.10,27,#1 |
| 69 | .* Phone Number |
| 70 | :PUT.11,27,%0 |
| 71 | .* Device type |
| 72 | :PUT.12,68,#3 |
| 73 | .* Serial Number |
| 74 | :PUT.17,62,#2 |
| 75 | .* VTAM ID |
| 76 | :PUT.19,70,#4 |
| 77 | :SENDKEY.ENTER |
| 78 | :ENDTABLE.PRIMARY |
| 79 | .* |
| 80 | .* |
| 81 | .* Table to execute when the Home quick key is pressed |
| 82 | .* |
| 83 | .* |
| 84 | :QUICKKEY.Alt+1, Go to home state |
| 85 | :PUT.1,7,:init |
| 86 | :SENDKEY.ENTER |
| 87 | :ENDQUICKKEY.Alt+1 |

Line 1-3 is a comment on the purpose of this table. Comments have no effect on the object created.

Line 4 is the name of the table. This is the name by which the table should be referred to in the system profile.

Line 6 is a message that will be printed at compile table run time. It tells the system administrator that he is compiling the correct table. This statement has no effect on the object code.

Line 10 tells the table compiler that the following statements interact with session A. This remains in effect until the next ":SETSESSION" statement.

Line 14 ensures that the current screen on session A at line position row 3, column 2 is "BLG0EN20." If the location contains the characters "BLG0EN20" the HAT table continues. If it does not contain the text screen, a message is displayed on the screen asking the service representative to move to the correct screen. When he moves to the correct screen, he can press the continue key and proceed to the next HAT command or press the halt key combination to stop the table.

Line 18 copies the contents of the ANI supplied by the PBX %1 into the user variable #0.

Line 19 inserts a dash (—) in the user #0 at the fourth character if the length of #0 is equal to 7, otherwise no character is placed. This has the affect of turning a 7-digit number from the PBX into a regular phone number of the form xxx-yyyy.

Line 20 enters the character string 13,8,#0,2,VID/PCS/PRT,90 at location row 1, column 7. The characters #0 are expanded out to the value of user variable 0.

Line 21 causes the enter key to be executed for the data that was just entered.

Line 25 verifies that the user is on the next correct screen as in line 14.

Line 26 displays a message to the service representative that he needs to select a report and then continue or end the table by pressing the corresponding key combination.

Line 27 causes the table to pause until the end or continue key combination is pressed.

Line 28 allows the user to continue the table, the enter function is executed for him by this command.

Line 29-51 cause information to be retrieved from host screens and placed into user variables.

Line 34 retrieves the text at row 7, column 27 from session A for a length of 4, and places it into user variable 1.

Line 52-77 causes the system to go to the problem entry panel by first going to the top panel and then entering the keystrokes to get to the problem entry panel. The values that were collected are then placed in the correct place on the screen and enter is executed.

Line 78 makes the end of the primary table.

Line 79-87 specifies a quick key to get to the home state for this application.

Line 84 specifies the name of the quick key to use for this application, ALT1 and a short explanation about the function of the quick key.

Line 85 identifies the combination of keys for the quick key by entering a set of keystrokes.

Line 87 makes the end of the quick key statement. Note that the line numbers under the REF column are for reference only.

To create a HAT the user must perform a number of steps. The following steps must be performed when creating a HAT for a particular application. First, list the steps to be performed in the host application running on the host computer 200, when a telephone call is received. A HAT operates by emulating the keystrokes that the user reviews to perform some tasks on the host application program running on the host 200. List each keystroke and the host screens, the location of the data fields on the screen, and the data which is needed for each step. Second, list the steps to be performed in the host application when a quick key combination is specified. Third, write the tables for each procedure that you want to employ. Use the table language which has been described to perform the actions in the list created. Fourth, combine the tables into a single file either by copying them or embedding them. The fifth step is to compile the file by running a table compiler. Then the sixth step is to copy the output file into the workstation 100 memory 104. The seventh step is to test the HAT to check for any problems and then the eighth step is to test the table before actually installing the HAT on the service representative's workstation.

EXAMPLE OF A CALL PROCESSING APPLICATION USING TWO HOSTS COMPUTER SESSIONS

The following is a description of the application of the invention to conducting two terminal sessions with two host computers in a telephone order entry application. FIG. 5 illustrates an architectural diagram of the workstation selectively conducting two terminal sessions with two host computers. The workstation 100 includes the bus 102 which interconnects the memory 104, the CPU 106, the display adapter 108, the host adapter 110, the keyboard interface 112, and the local area network adapter 114. The workstation 100 can be an IBM PS/2 model 80, for example. The LAN adapter 114 is connected through a LAN 116 to a gateway 118 which in turn connects to a private branch exchange (PBX) 120 which is connected to the public telephone network 122.

Also included in the architectural diagram of FIG. 5 is a host A computer 200 which includes a bus 202 which interconnects the memory 204, a CPU 206, the DASD 208 and the terminal interface 210. The host A computer 200 may be an IBM AS/400 computer, for example.

Also included in the architectural diagram of FIG. 5 is the host B computer 300 which includes the bus 302 which interconnects the memory 304, the CPU 306, the DASD 308 and the terminal interface 310. The host B computer 300 can be an IBM 3090, for example.

The host A computer 200 can have its terminal interface 210 connected over line 162 to the host A adapter 110 of the workstation 100. The host B computer 300 can have its terminal interface 310 connected over line 164 to the host B adapter 110 of the workstation 100.

The memory 104 in the workstation 100 can have an automatic number identification (ANI) buffer 126 therein which is dedicated to store ANI data received through the LAN adapter 114 from the PBX 120 which came from the public telephone network 122. The memory 104 can also have a host A buffer 154 therein which is dedicated to receiving and transmitting data between the workstation 100 through the host A adapter 110 and the terminal interface 210 of the host A computer 200. The terminal buffer 214 in the memory 204 of the host A computer 200 is dedicated to sending and receiving data between the host 200 and the workstation 100. The memory 104 of the workstation 100 can also have the host B buffer 158 therein which is dedicated to sending and receiving data over through the host B adapter 110 and the terminal interface 310 of the host B computer 300. The terminal buffer 314 in the memory 304 of the host 300 is dedicated to sending and receiving data with the workstation 100.

Figure 6:
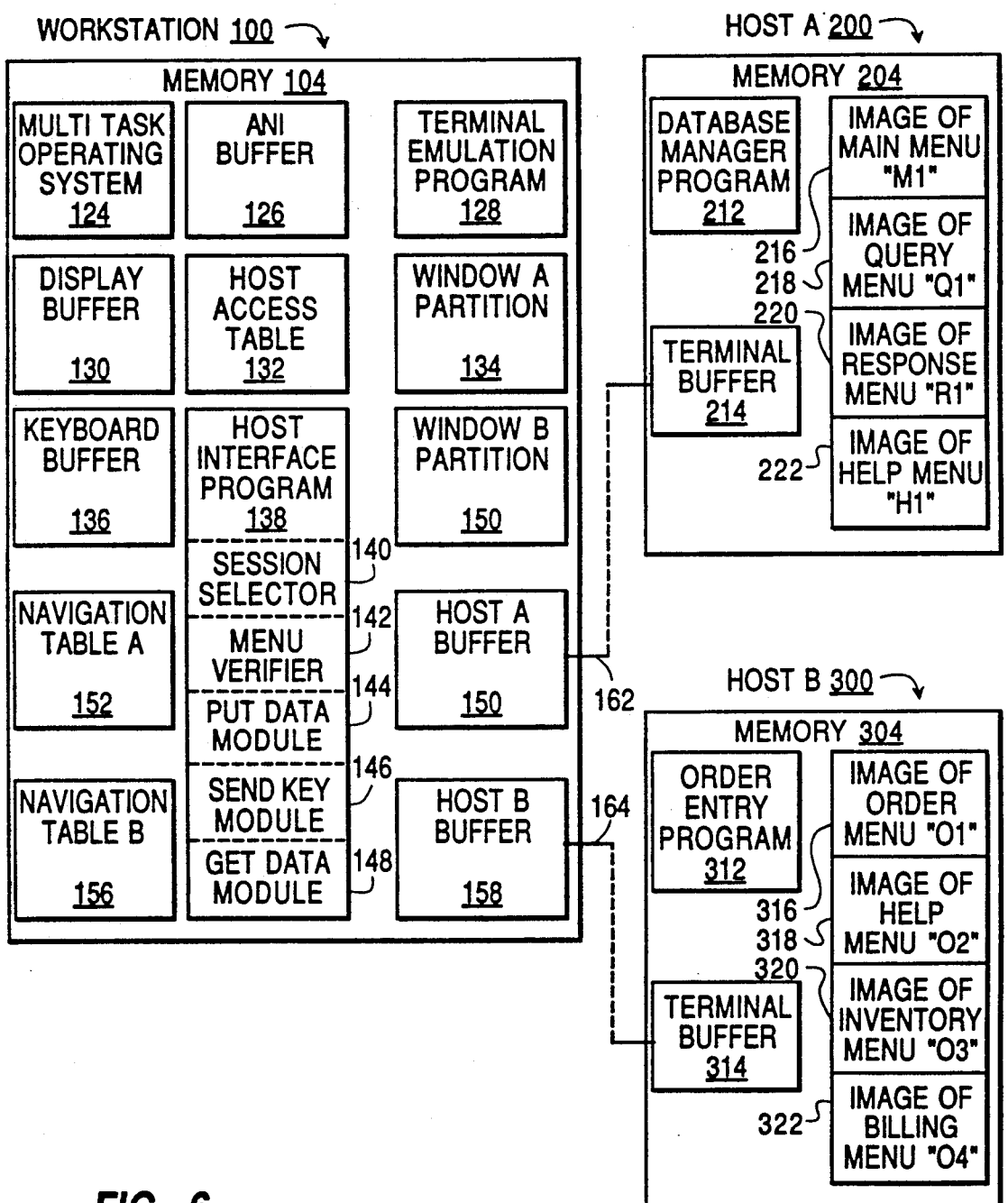
FIG. 6 is a more detailed architectural diagram of the system of FIG. 5, showing in detail the memory organization for the workstation, and the two host computers.

FIG. 6 is a more detailed architectural diagram of the system shown in FIG. 5, with a detailed description of the organization of the memory 104 for the workstation 100, the memory 204 for the host A computer 200, and the memory 304 for the host B computer 300.

The memory 104 in the workstation 100 includes a multi-tasking operating system 124 which can be the OS/2 Extended Edition by IBM. The memory 104 also includes the ANI buffer 126. The memory 104 also includes a terminal emulation program 128, which can be for example the 3278/79 Emulation Control Program by IBM. The 3270 data stream is designed for communications between a host computer and a "dumb terminal," such as an IBM 3278, characterized hereinafter as a 3270-type terminal. The path between the host computer and the 3270-type terminal is usually through a communications control unit, such as an IBM 3274. Host application programs which must interface with a 3270-type terminal transmit a screen's worth of display data to the terminal and receive back a screen's worth of display data from the terminal, without the requirement for the terminal performing sophisticated processing steps on the data, other than the alteration of fields within menus which are represented by the display data. The IBM 3278 can perform more efficient transfers by transmitting only those portions of the screen image which have been changed. Additional information the 3270-type terminal principle of operation and protocol can be found for example in the "3270 Information Display System Data Stream Programmer's Reference," GA23-0059, "Introduction to the IBM 3270," GA27-2739 and "IBM 3274 Description and Programmer's Guide," GA23-0061, published by IBM Corporation and available through IBM branch offices. The terminal emulation program 128 manages a communications session with a host such as the host 200, by setting aside a window partition such as window A partition 134 in the memory 104, in which a screen's worth of display data can be sent and received over line 162 with the terminal buffer 214 in the host A computer 200. The terminal emulation program 128 can accommodate multiple, mutually independent terminal emulation sessions by setting aside a window partition in the memory 104 for each session to be conducted with a host computer or with a plurality of host computers. The window B partition 150 in memory 104 of FIG. 6, will serve to enable the terminal emulation program 128 to conduct a second session over line 164 to the terminal buffer 314 of the host B computer 300.

Memory 104 in the workstation 100 further includes the display buffer 130 and the keyboard buffer 136. In accordance with the invention, memory 104 includes a host access table 134 which contains a sequence of user-defined commands to enable the workstation 100 to conduct one or more terminal emulation sessions with one or more host computers running one or more existing host computer applications. A distinct advantage provided by the host access table 132 is that its use enables the workstation 100 to exercise the host application programs without any reprogramming of the host application program. The host interface program 138 in the memory 104 executes the commands set forth in the host access table 132, either by running as an integrated object program module with the host access table 132 at run time, or alternately by performing the role of an interpreter program, interpreting the commands in the host access table 132. The host interface program 138 includes the session selector 140, the menu verifier 142, the put data module 144, the sendkey module 146 and the get data module 148.

Further in accordance with the invention, the menu verifier 142 includes a menu navigation routine which makes use of a navigation table A 152 and a navigation table B 156 to enable the rapid and automatic navigation through the network of menus in a host application program which is being run through the terminal emulation program 128 in the workstation 100.

FIG. 6 also shows a detailed illustration of the memory 204 for the host A computer 200. In a telephone order entry application being described, the host A computer 200 will be running a data base manager program 212 for the purpose of storing and accessing a data base of customer information. When a telephone call is received by the PBX 120, the workstation 100 will interact with the host A computer 200 in a first terminal session, to access the customer data corresponding to the ANI data received from the PBX 120. The data base manager 212 is a pre-existing program which was designed to interface with a 3270-type terminal in a 3270 data stream operation, for example. As such, the data base manager program 212 will have set aside menu images in its memory 204 which are respectively accessed and transmitted through the terminal buffer 214 to the window A partition 134 of the workstation 100. The window partitions are illustrated in FIG. 6 as the image of the main menu "M1" 216, the image of the query menu "Q1" 218, the image of the response menu "R1" 220, and the image of the help menu "H1" 222.

Similarly, the host B computer 300 in the telephone order entry application described here, includes an order entry program 312. The order entry program 312 is a pre-existing program which was designed to accept from a 3270-type terminal an order menu specifying items to be ordered from inventory. The order entry program 312 includes inventory and billing features. The order entry program 312 which was designed to operate with the 3270-type terminal, has set aside the images of menus which are respectively transmitted through the buffer terminal 314 to the window B partition of the workstation 100. The order entry program 312 will make use of the menu images shown in FIG. 6, including the image of the order menu "O1" 316, the image of the help menu "O2" 318, the image of the inventory menu "O3" 320, and the image of the billing menu "O4" 322.

Figure 7:
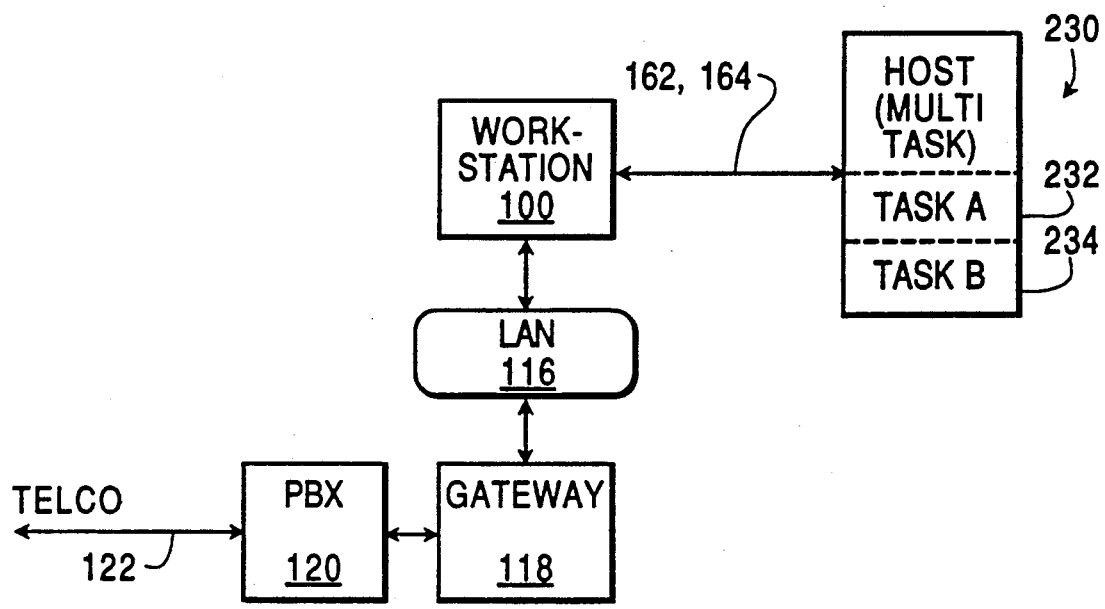
FIG. 7 is an alternate embodiment of the invention showing that the host computer can operate in a multitasking mode to perform task A and task B.
Figure 8:
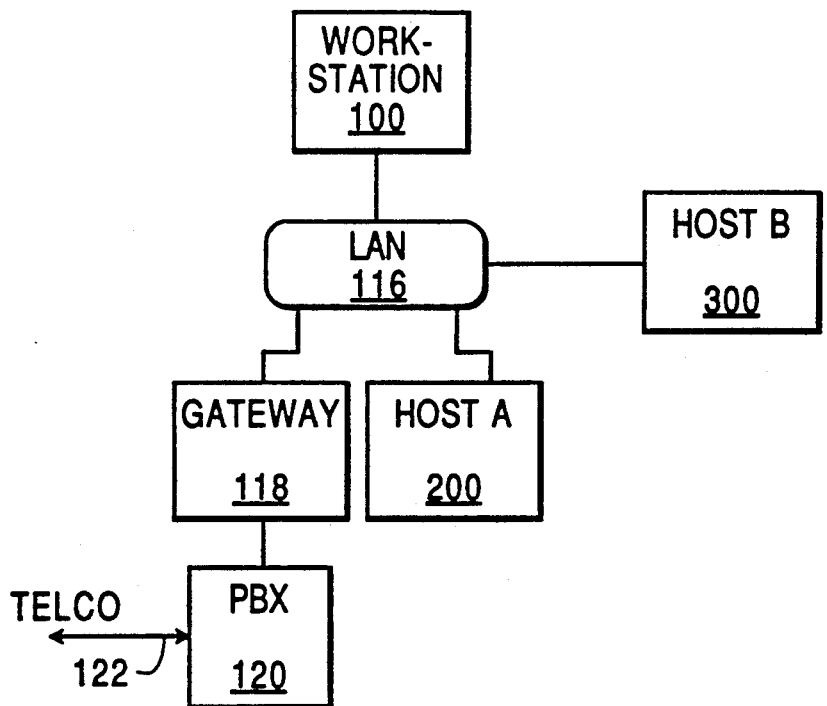
FIG. 8 shows another alternate embodiment of the invention wherein the two host computers and the workstation are connected to a local area network.
Figure 9:
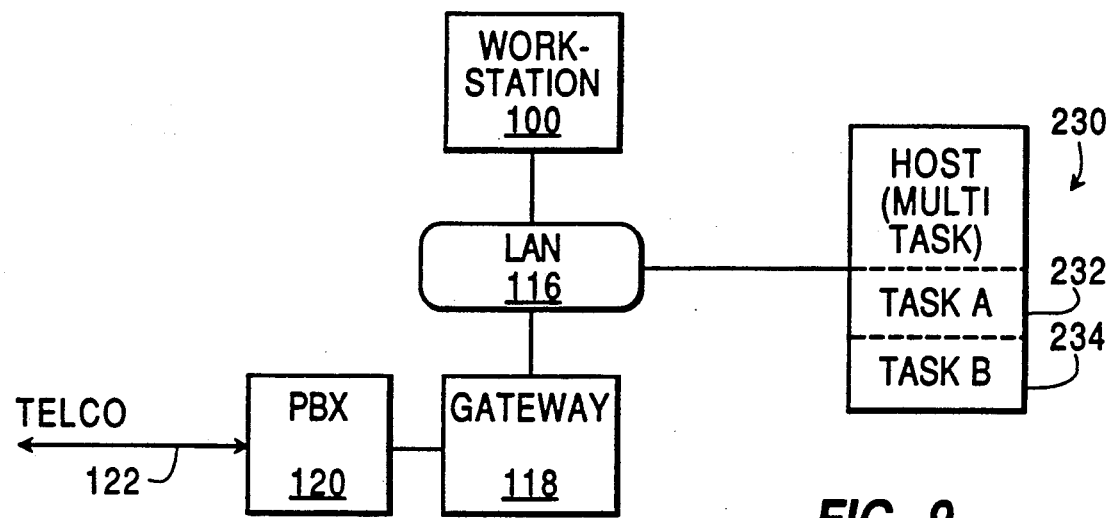
FIG. 9 shows still another alternate embodiment of the invention wherein the workstation and a single, multi-tasking host computer are connected to the local area network.

Before turning to a detailed description of the operation of the invention in the telephone order entry application, a brief description of alternate architectural embodiments of the two terminal architecture of FIG. 5 will be described in FIGS. 7, 8 and 9. FIG. 7 shows a first alternate embodiment of the invention in which the two host computers 200 and 300 are substituted by a single multi-tasking host computer 230 in which is running a task A 232 which performs the data base manager program 212, and the task B 234 which performs the order entry program 314. FIG. 8 shows an alternate embodiment of the invention in which the host A computer 200 and the host B computer 300 can be connected along with the workstation 100 to the LAN 116. In FIG. 9, still another alternate embodiment of the invention is shown wherein the multi-tasking host computer 230 is connected to the LAN 116 along with the workstation 100. In each of these alternate embodiments, the principle of the invention, as is demonstrated in the telephone order entry application, is the same.

Figure 10:
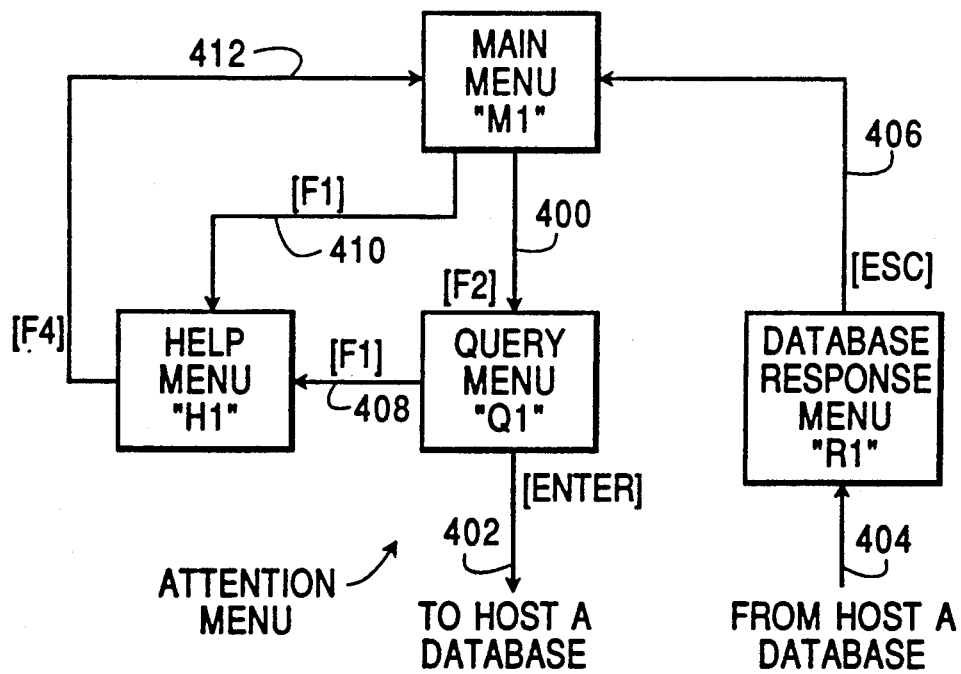
FIG. 10 is an organizational diagram showing menu navigation in a data base manager program running in session A on a first host computer.
Figure 11:
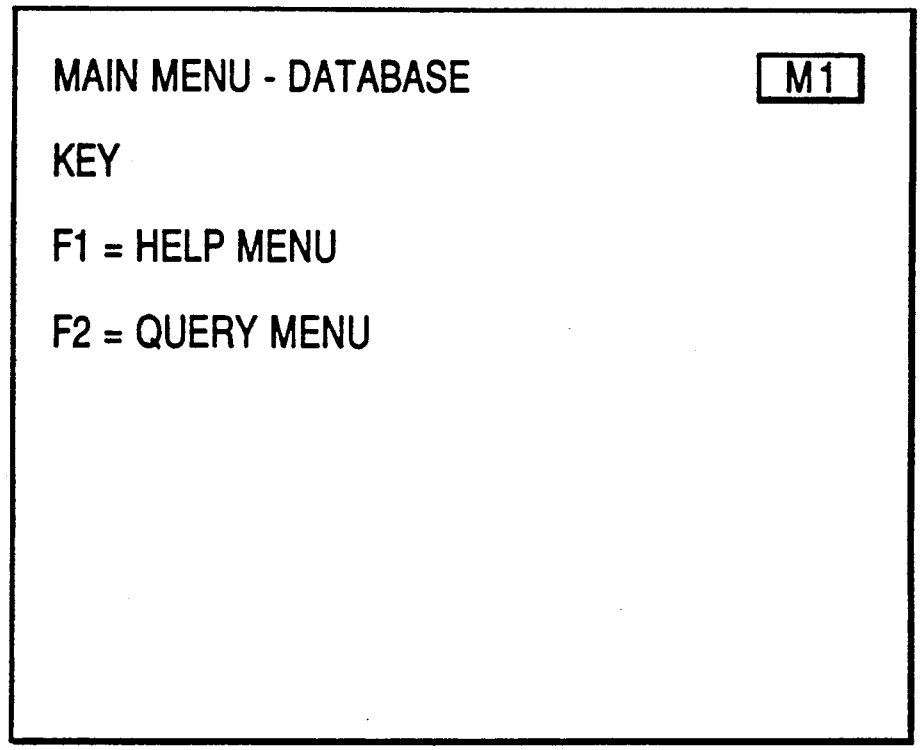
FIG. 11 shows the main menu for the data base manager program.
Figure 12:
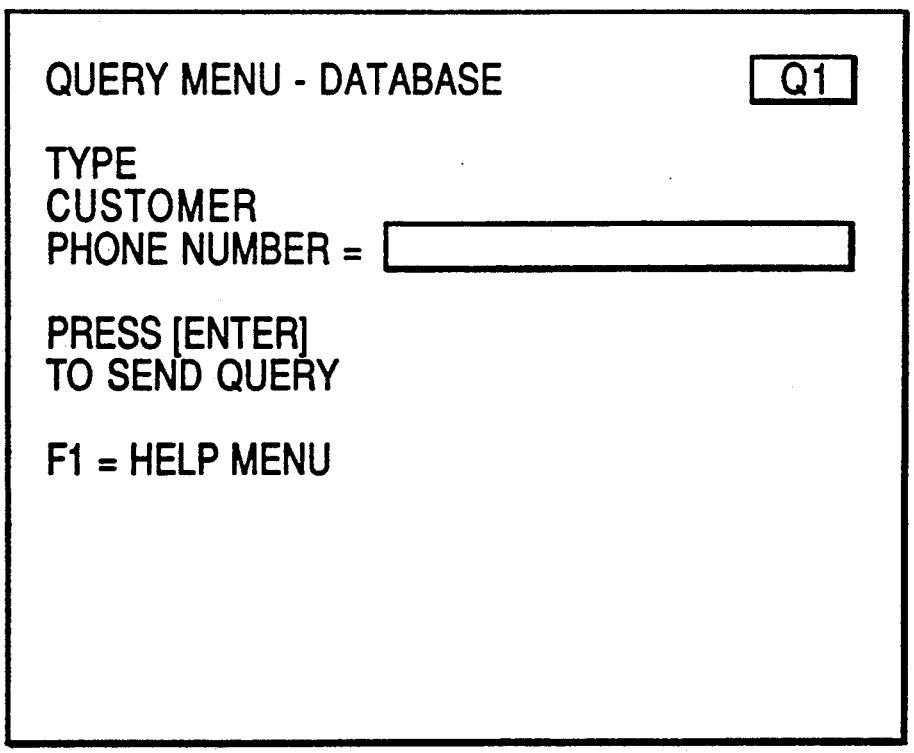
FIG. 12 shows the query menu of the data base manager program.

FIG. 10 is an organizational diagram of menu navigation in the data base manager program 212 running in session A with the workstation 100. Data base manager program 212 is a pre-existing host based program which is designed to interact with a 3270-type terminal. As such, the data base manager 212 maintains the menu images 216, 218, 220 and 222 in the memory 204. Navigating between these four menu images requires the depression of an action key such as a function key, enter key or an escape key, and this is shown in FIG. 10. The main menu "M1" is shown in FIG. 11 and it can be seen that by depressing the function key F1, the path 410 is followed to the help menu "H1" which is shown in FIG. 14. Alternately, if the function key F2 is depressed in the main menu "M1," the path 400 is followed to the query menu "Q1," which is shown in FIG. 12. When a query menu "Q1" has the customer phone number field filled in and the user presses the enter key, path 402 is followed to invoke the data base manager program 212 to perform a search using the phone number as a query term. Data stored in the data base managed by the data base manager program 212 is located on the DASD 208, and consists of customer data. The data base manager program 212 will return the data base response menu "R1" over path 404, the data base response menu being shown in FIG. 13. The data returned from the data base includes the customer name, street address, city and state, and the purchase history for the customer. The user can return to the menu "M1" over path 406 by pressing the escape key as is shown in the menu navigation diagram of FIG. 10. In its original implementation, the data base manager program 212 was used in a manual telephone order entry application wherein a user at a workstation would receive a telephone call and would ask the calling customer for his telephone number or for other information so that the data base managed by the data base manager program 212 could access the related information on the 15 customer's purchase history.

One of the features of the invention disclosed herein is the ability to automatically navigate through the network of menus in an existing host based program such as a data base manager program 212, by using a navigation table and a navigation table routine. This enables the user to designate an attention menu, such as the query menu "Q1" in the data base manager program 212, which will be the preferred initial menu to be automatically displayed to the user when a telephone call is received from a customer. In accordance with the invention, when the PBX 120 informs the workstation 100 that a call has been received and provides the ANI data which includes the calling customer's telephone number, the menu verifier module 142 in the host interface program 138 will ensure that the query menu "Q1" will be immediately made available for the entry of the received calling party's telephone number so as to enable an immediate accessing by the data base manager program 212 of the related customer information. As will be described later, the navigation table 152 shown in FIG. 15 provides navigation data to enable the host interface program 138 to navigate from any currently active menu of the data base manager program 212 to the attention menu which, in this case is the query menu "Q1."

Figure 16:
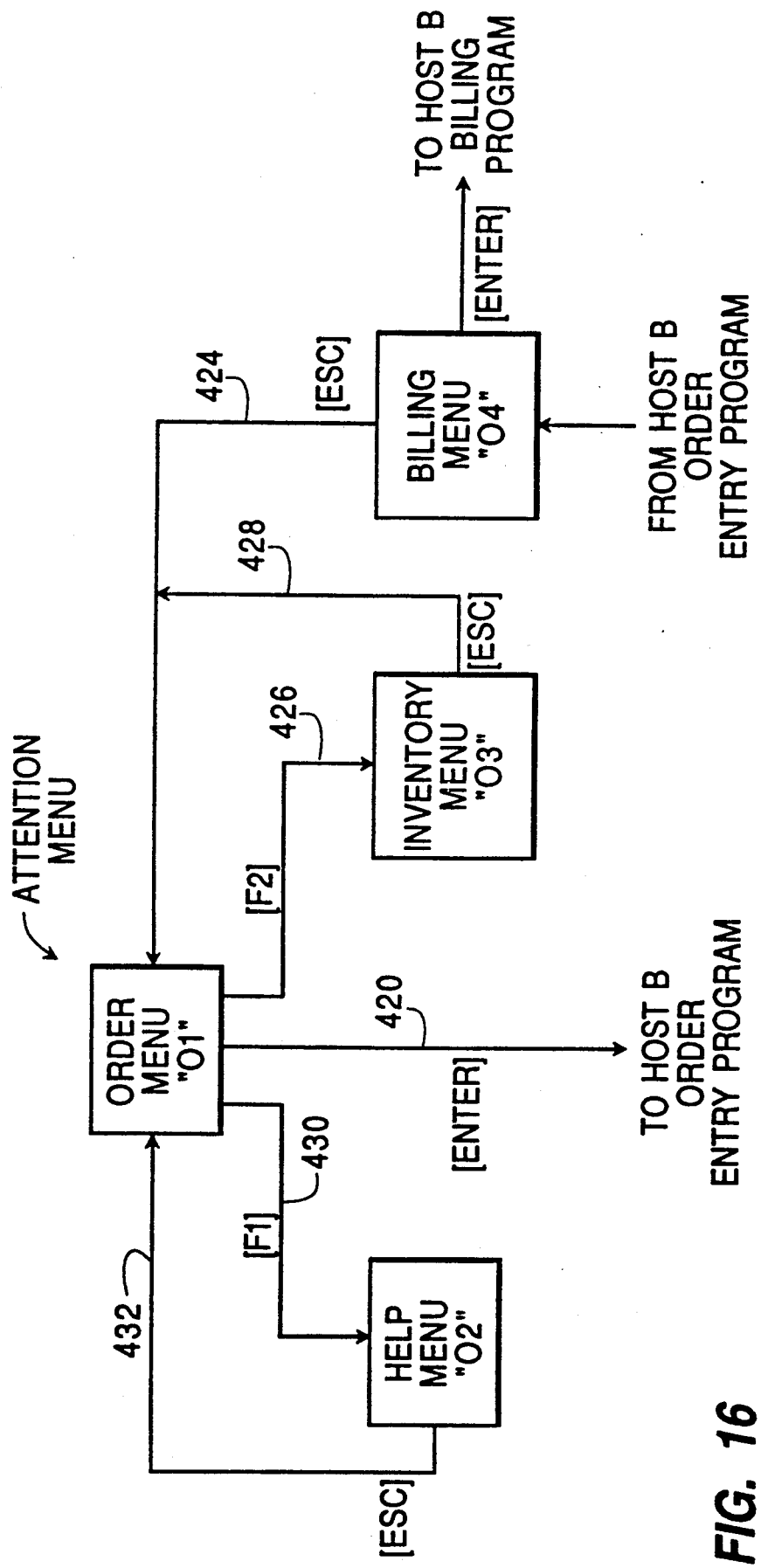
FIG. 16 is an organizational diagram showing menu navigation for an order entry program running on session B in the second host computer.

FIG. 16 shows an organizational diagram for the menu navigation through the menus for the order entry program 312 running in session B on the host B computer 300. The order entry program 312 is another pre-existing host based program which was designed to interface with a 3270-type terminal. As such, the order entry program 312 includes a plurality of menus whose images are maintained in the memory 304 and a predefined routing arrangement to navigate between the menus, as is shown in FIG. 16. The order menu "O1" which is shown in FIG. 17, will have the customer name, street address, city and state information entered by the user and also the specific items and quantities to be ordered by the customer. In the pre-existing applications of the order entry program 312, the user would manually enter the customer name, street and city and state information, along with the item and quantity information and then would press the enter key at his 3270-type terminal. The terminal would transmit, using the 3270 protocol, the order menu "O1" to the host computer where the order entry program 312 would process the order. FIG. 16 shows that the path 420 to the order entry program is followed from the order menu "O1" by pressing the enter key. FIG. 16 also shows that path 422 from the order entry program to a billing menu "O4" occurs with billing information provided on the billing menu. The user can press the escape key to pass on path 424 back to the order menu "O1." Alternately, a user could press the enter key from the billing menu if the user wished to pass to a host billing program, for example. If the user were in the order menu "O1" and pressed the function key F2, path 426 would lead to the inventory menu "O3." To pass from the inventory menu "O3" back to the order menu "O1," the user would press the escape key to pass over the path 428. If the user is in the order menu "O1" and presses the function key F1, path 430 would pass to the help menu "O2." To return from the help menu to the order menu, the user would press the escape key to pass over path 432.

In accordance with the invention, it is desirable to transfer the customer data such as the customer name, street address, city and state from the data returned from the data manager program 212 on session A, in the data base response menu "R1," to the order menu "O1" in session B so that that data need not be retyped by the user but instead, can be passed along with additional items and quantities to be ordered, to the host B computer to be processed by the order entry program 312. In order to do this, in accordance with the invention, the user will define as the attention menu in session B, the order menu "O1" which is desirable to have available as the first menu when session B is activated. In accordance with the invention, the navigation table for session B shown in FIG. 18, is navigation table 156 which stores the navigation data necessary to shift from any of the menus in the order entry program 312 to the attention menu which the user has defined as the order menu "O1." In this manner, data which has been returned from the data base manager program 212 during session A, can be immediately transferred into the order menu "O1" in the session B for the order entry program 312.

Figure 19:
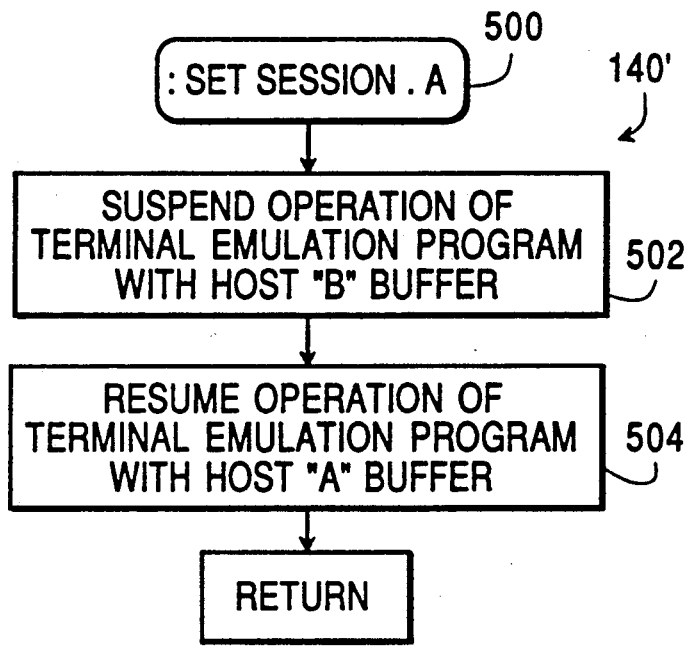
FIG. 19 shows a flow diagram of the SETSESSION.A command for the session selector 140.

FIG. 19 shows a flow diagram of the :SETSESSION.A command 140' which is a part of the session selector 140 of the host interface program 138. The flow diagram starts with entry point 500 and passes to step 502 which suspends operation of the terminal emulation program 128 with the host B buffer 158 and the window B partition 150. The flow then passes to step 504 which resumes the operation of the terminal emulation program 128 with the host A buffer 154 and the window A partition 134. This resumes the session A between the workstation 100 and the host A computer 200. The flow diagram of FIG. 19 then returns to the main program.

Figure 20:
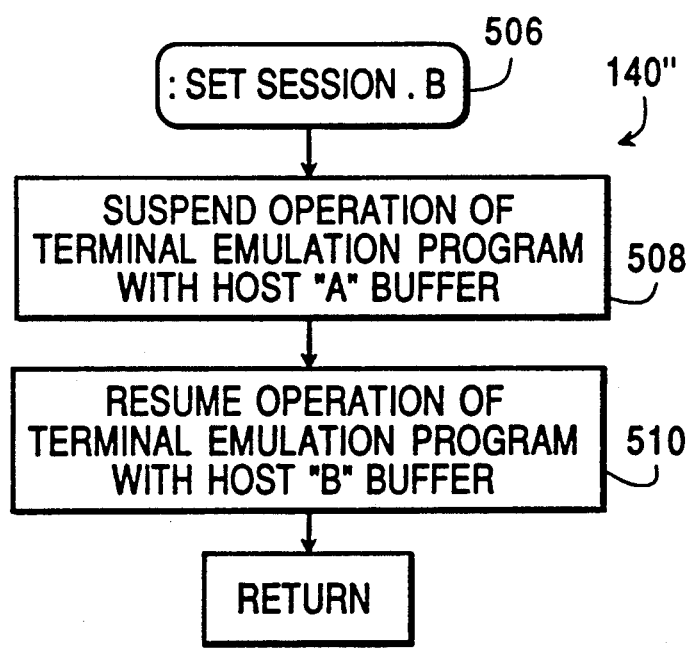
FIG. 20 shows the flow diagram for the SETSESSION.B command for the session selector 140.

FIG. 20 is a flow diagram similar to FIG. 19, but for the :SETSESSION.B command 140" which is a part of the session selector 140, but resumes the B session between the workstation 100 and the host B computer 300.

Figure 21:
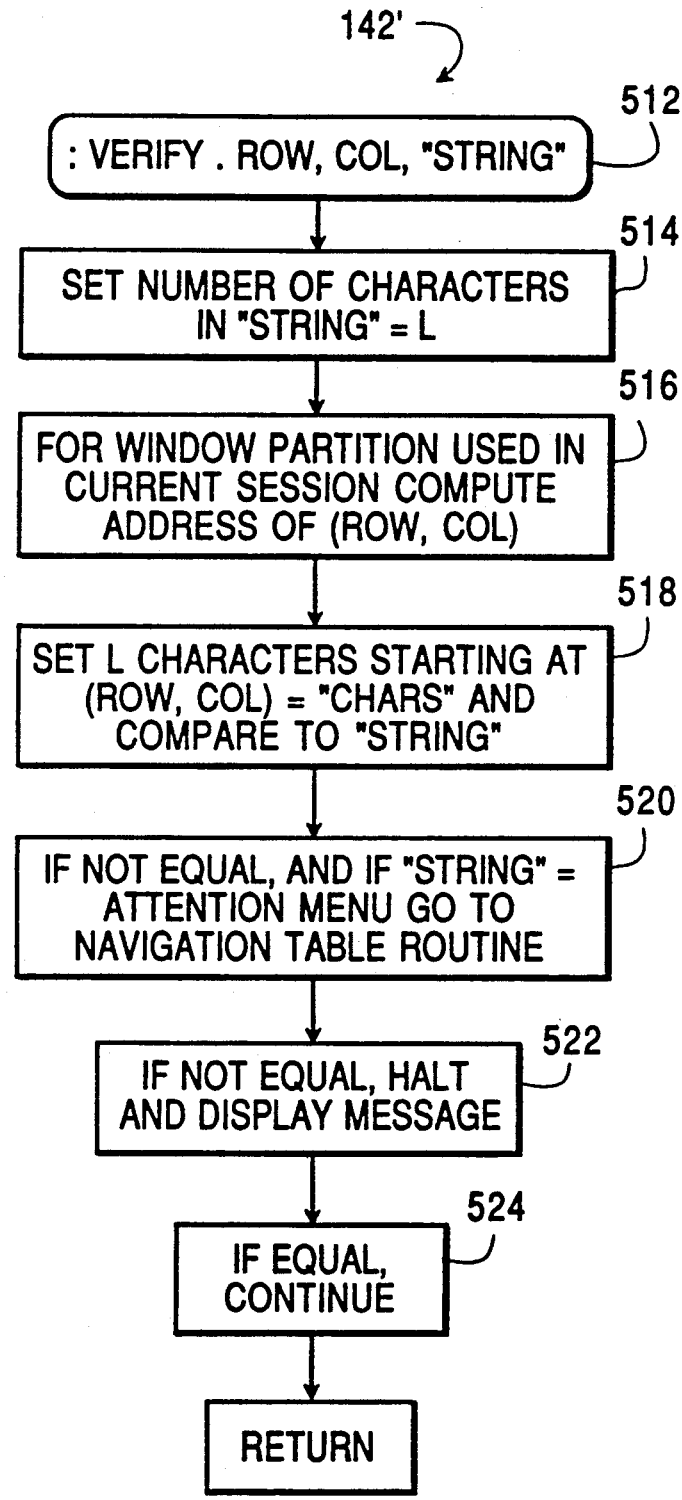
FIG. 21 shows the flow diagram for the VERIFY command for the menu verifier 142.

FIG. 21 is a flow diagram of the verify command 142' which is a part of the menu verifier module 142 of the host interface program 138. The verify command will ensure that a particular menu whose identity "string" at the location "row,col" is the desired menu in the current session window A 134 or window B 150. The entry point 512 flows to the step 514 which sets the number of characters in the "string" equal to the length L. Then in step 516, for a window partition used in the current session, either window A 134 or window B 150, the address is computed in the memory 104 for the location of "row,col." Then in step 518, the length L is set for the number of characters starting at the memory location "row,col" with the string value of the character string in the menu occupying the window partition in the current session. For example if the main menu for the data base manager program 212 in session A were occupying window A partition 134, then the value of "M1" would be compared with the "string" value in step 518. In accordance with the invention, if the strings are not equal and also if the desired menu "string" is the attention menu which has been previously designated by the user, then step 512 will go to the navigation table routine described in FIG. 22. Alternately in step 522 if the strings are not equal, but the "string" is not the attention menu string, then the host interface program 138 will stop executing the host access table 132 and will display a message to the user. Alternately in step 524 if the desired "string" is equal to the menu identifier in the window partition, then step 524 is satisfied and the program returns to the main menu.

Figure 22:
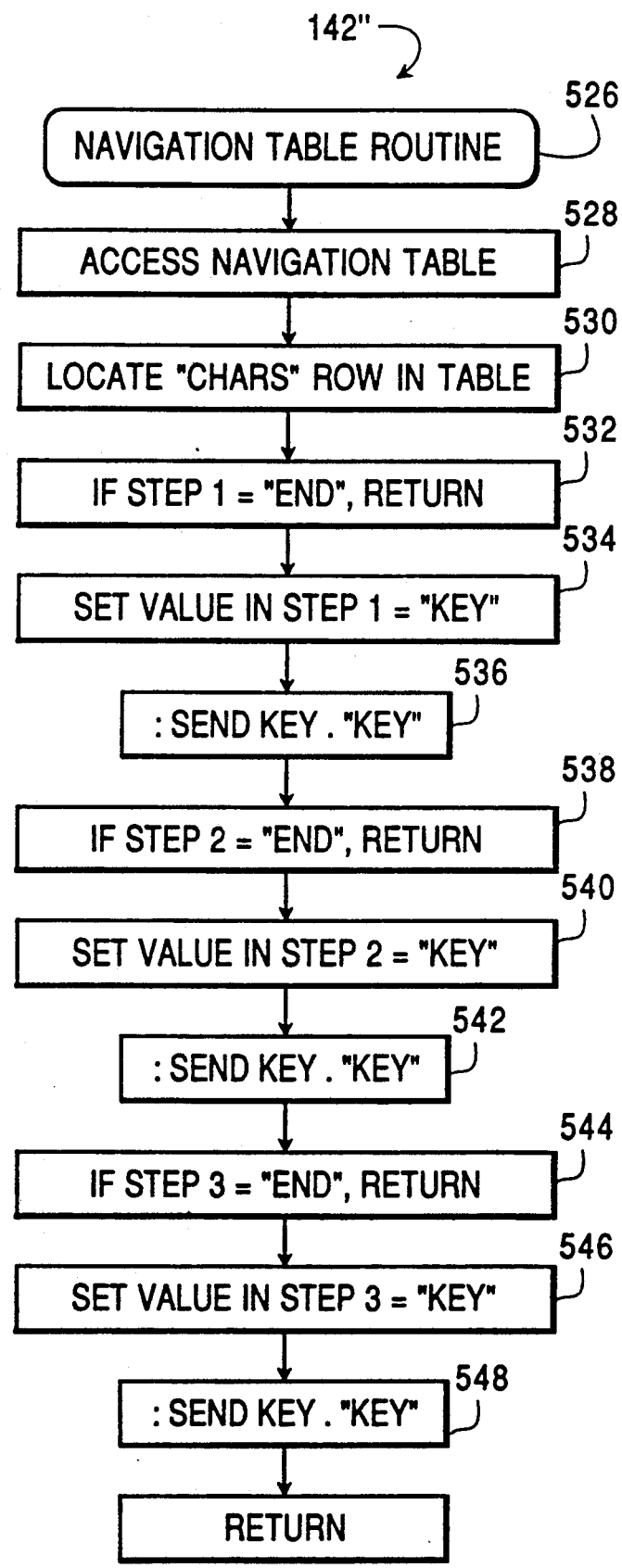
FIG. 22 shows a flow diagram of the navigation table routine for the menu verifier 142.

FIG. 22 shows a navigation table routine 142" which is a part of the menu verifier module 142 of the host interface program 138. If step 520 of the verify flow diagram of FIG. 21 determines that the attention menu is the desired menu and it is currently not present in the current session window, the execution of the navigation table routine 142" will automatically move the desired attention window into the window partition. This is done in conjunction with the navigation table 152 or 156. For example, at the time that a call is received on the PBX 120 and the ANI data is available at the workstation 100 to be transmitted to the data base manager program 212 in the host A computer 200, the session A will be resumed by the terminal emulation 128 and the verify command will determine in step 520 that the attention menu is desired, but that it finds the help menu "H1" is the current menu being displayed by the data base manager program 212 in the window A partition 134 of the workstation 100. Then in accordance with the invention, the navigation table routine starts at the entry point 526 of FIG. 22, and passes to step 528 which accesses the navigation table 152 in FIG. 15. Then in step 530, the row in table 152 is located which contains the current window ID "H1." This will be the third row as shown in FIG. 15. Then in step 532, the step 1 column contains the function key F4 character. If in step 532 it was determined that the "end" statement was present, then the navigation table routine would return to the main program. However that is not the case and in step 534 the value in step 1, that is function key F4, is set equal to the "key" and then in step 536 a sendkey command is performed for the function key F4 which sends the function key F4 character to the keyboard buffer 136, and issues a keyboard interrupt. This causes the terminal emulation program 128 to transmit the contents of the window A partition 134 through the host A buffer 154 over line 162 to the terminal buffer 214 of the host A computer 200 for processing by the data base manager program 212. Having received the function key F4, the data base manager program 212 will return the main menu "M1," as can be seen in FIG. 10. Then in FIG. 22, the navigation table routine will have step 538 determine if step 2 in the navigation table of FIG. 15 for the third row determining whether the "end" statement is present in step 2. Since function key F2 is present in step 2, the navigation table routine of FIG. 22 goes to step 540 which sets the value of the function key F2 in step 2 equal to the "key." Then in step 542, the sendkey command is executed to transmit the function key F2 character to the keyboard buffer 136 and issue a keyboard interrupt. This causes the terminal emulation program 128 to transmit the current contents of the window A partition 134 in session A to the data base manager program 212 in the host A computer 200. This is the main menu "M1" and the receipt of the function key F2 will cause the data manager program 212 to return the query menu "Q1" which is the desired attention menu wanted in the window A partition 134. Then in step 544 of FIG. 22, the navigation table routine checks whether the "end" statement is present in step 3 and if it is, the program returns to the main menu. That is the case for this example and, in accordance with the invention, the navigation table routine has achieved moving the attention menu which is the query menu "Q1" into the window A partition 134, as desired. In FIG. 22 the flow diagram continues with steps 546 and 548 to check on still longer navigation sequences which might have occurred in more complex menu arrangements.

Figure 23:
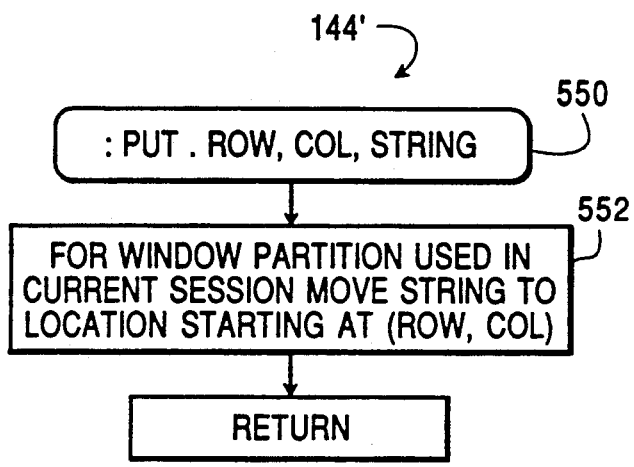
FIG. 23 shows the flow diagram for the PUT command for the put data module 144.

FIG. 23 describes the PUT command 144' which is a part of the put data module 144 of the host interface program 138. The PUT command starts at the entry point 550 and goes to step 552 which, for the window partition used in the current session, such as window A 134 or window B 150, it inserts a string which is provided in the PUT command, at a location in the menu starting at the "row,col" also designated in the PUT command.

Figure 24:
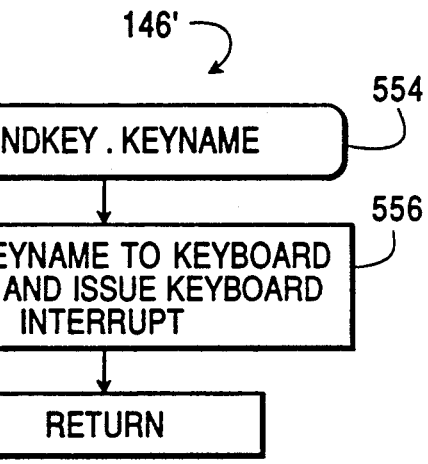
FIG. 24 shows the flow diagram for the SENDKEY command for the sendkey module 146.

In FIG. 24, the :SENDKEY command 146', is shown in flow diagram, as a part of the sendkey module 146 in the host interface program 138. The :SENDKEY command starts at the entry point 554 and goes to step 556 which moves the key name which is provided in the :SENDKEY command, to the keyboard buffer 136 and issues the keyboard interrupt.

Figure 25:
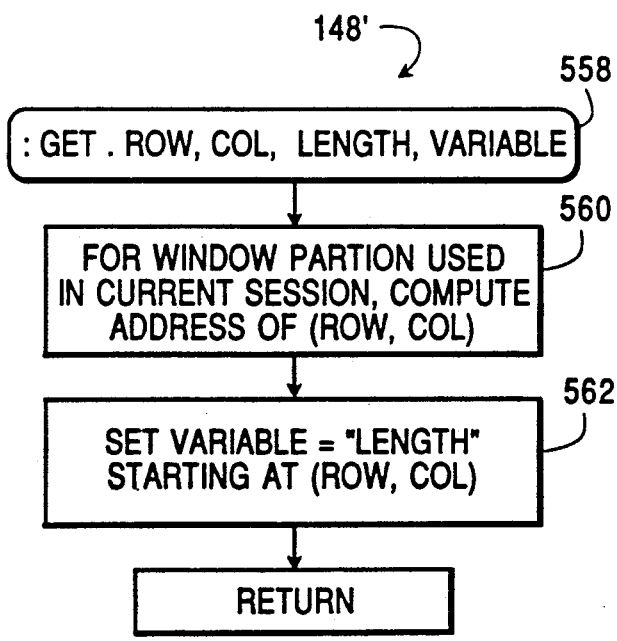
FIG. 25 shows the flow diagram for the GET command for the get data module 148.

FIG. 25 is a flow diagram of the GET command 148' which is a part of the get data module 148 in the host interface program 138. The GET command includes "row,col" data to indicate the starting point for a string which is to be extracted and copied from a current window partition. The GET command also includes the "length" value which is the length of the string to be copied from the window. The GET command also includes the variable name which is the variable to which the string copied from the window is to be assigned. The entry point 558 for the GET command flows to step 560 which, for the window partition used in the current session, such as the window A in session A or the window B in session B, the address is computed for the starting point "row,col." Then in step 562, the number of characters within the "length" starting at the location "row,col" is copied and set equal to the variable name.

Figure 26B:
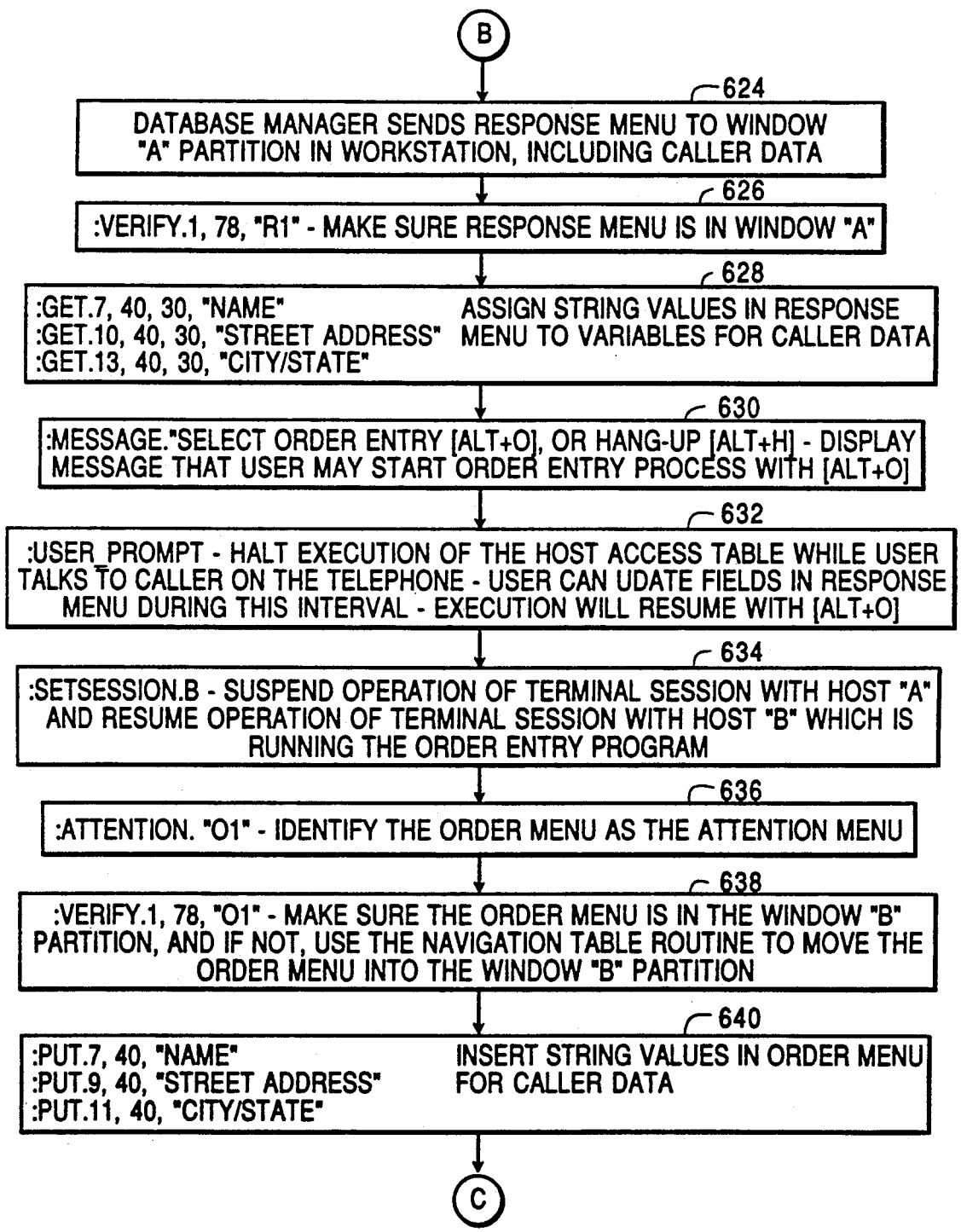
Figure 26C:
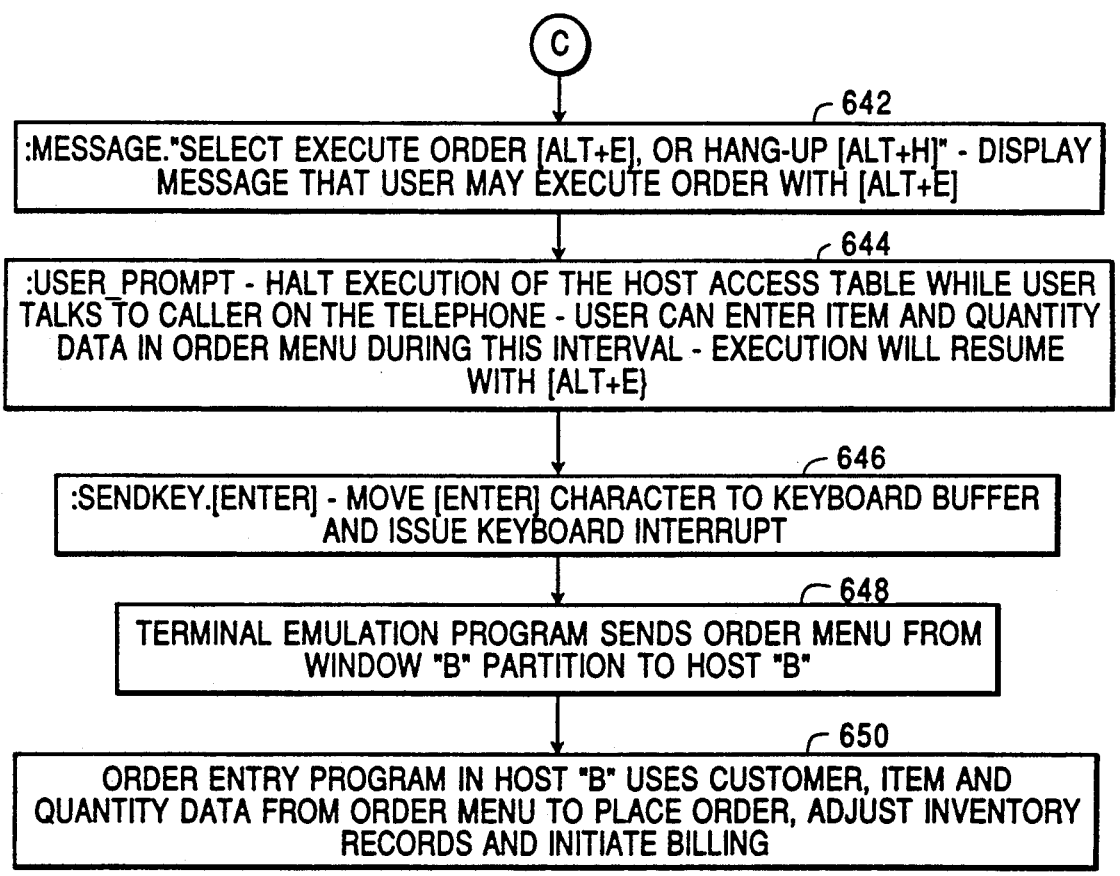

FIG. 26 is a flow diagram for the telephone order entry application using two terminal sessions. The flow diagram of FIG. 26 shows the sequence of operational steps using the host access table (HAT) 132 shown in FIG. 27. The flow diagram of FIG. 26 and the HAT of FIG. 27 carry out the sequence of operational steps for the telephone order entry application which is run with the workstation 100 in FIG. 5 conducting two terminal sessions with the two host computers, host computer A 200 and host computer B 300. The process 600 whose flow diagram is shown in FIG. 26 starts at step 602 when a call is received at the PBX with automatic number identification (ANI) data which includes the caller's phone number. Then in step 604, the PBX connects the call to the phone at the workstation 100 and it sends the PBX data including the caller's phone number, to the gateway 118. Then in step 608, the LAN adapter 114 issues an interrupt which causes the host interface program 138 to begin execution of the commands in the host access table 132, also shown in FIG. 27.

In step 610, the host access table 132 has the :SETSESSION.A command, to resume operation of the terminal session with the host A which is running the data base manager program 212. Then in step 612, the host access table 132 provides the :ATTENTION."Q1" command, which identifies the query menu "Q1" as the attention menu for session A. Then, in step 614, the host access table 132 provides the VERIFY.1,78,"Q1" command which checks the field that row 1, column 78 to determine if the string "Q1" representing the query menu is in the window A partition 134. If "Q1" for the query menu is not in the window A partition 134, then the navigation table routine is executed to move the query menu "Q1" into the window "A" partition 134.

Then, in step 616 the :PUT.7,13,(phone number) command is provided, which will cause the insertion of the phone number from the PBX data, into the query menu in the window A partition 134. Then in step 618, the host access table 132 provides the :SENDKEY.ENTER command, which moves the enter character to the keyboard buffer 136 and issues a keyboard interrupt. In step 620, the terminal emulation program 128 then sends the query menu "Q1" from the window A partition 134 through the host A buffer 154 over the line 162 to the terminal buffer 214 in the host A computer 200. Then in step 622, the data base manager 212 in the host A computer 200 uses the phone number from the query menu "Q1" as a query term to access the data base in the DASD 208, to obtain caller data related to the party who initiated the telephone call to the PBX 120.

In step 624, the data base manager 212 sends the response menu "R1" to the window A partition 134 in the workstation 100, which includes the caller data which was accessed from the DASD 208. The caller data includes the name, street address and city and state of the calling party. Then, in step 626, the host access table 132 provides the :VERIFY.1,78,"R1" command, to make sure the response menu "R1" is now in the window A partition 134. Then in step 628, three consecutive :GET commands are provided to get the name, street address and city and state information from the caller data in the response menu "R1" in the window A partition 134 and assign those string values to user variables.

Then, step 630 has the host access table 132 provides a :MESSAGE ."Select Order Entry[Alt+0] or Hang-Up[Alt+H]" command, which displays the message that the user may start the order entry process by depressing the key combination Alt+0. In step 632, the host access table 132 provides the command USER-PROMPT, which halts the execution of the host access table 132 by the host interface program 138 while the user talks to the caller on the telephone. The user can update the fields in the response menu "R1" during this interval by making entries at his keyboard which go through the keyboard buffer 136. Execution of the host access table 132 by the host interface program 138 will resume when the user depresses the key combination Alt+0.

Step 634 has the host access table 132 providing the :SETSESSION.B command, which causes the terminal emulation program 128 to suspend operation of the terminal session A with the host A computer 200 by switching to the window B partition 150, to resume operation of the terminal session B with the host B computer 300 which is running the order entry program 636 has the host access table 132 provides the :ATTENTION,"01" command, which identifies the order menu "01" of the order entry program 312 as the attention menu for session B. Then, step 638 has the host access table 132 provide the :VERIFY.1,78,"O1" command, which makes sure that the order menu "01" is in the window B partition. Since the order menu "01" is the attention menu for session B, if it is not currently in the window B partition 150, step 638 will use the navigation table routine to move the order menu "01" into the window B partition.

Step 640 has a sequence of three :PUT commands which insert the name, street address and city and state data from user variables whose values are defined for a calling party into the order menu "01" in the window B partition 150. Then, step 642 has the host access table 132 provide the MESSAGE."Select Execute Order-[Alt+E]or Hang-Up[Alt+H]" command, which displays the message that user may execute the order by depressing the key combination Alt+E. Then step 644 has the host access table 132 provide the :USER-PROMPT command, which halts the execution of the host access table 132 by the host interface program 138 while the user talks to the caller on the telephone. The user can enter item and quantity data in the order menu during this interval. Then execution will resume when the user depresses the key combination Alt+E.

Step 646 has the host access table 132 provide the :SENDKEY.ENTER command, which moves the enter character to the keyboard buffer 136 and issues a keyboard interrupt. In step 648, the terminal emulation program 128 sends the order menu "01" from the window B partition 150 through the host B buffer 158 over line 164 to the terminal buffer 314 for processing by the order entry program 312 in the host B computer 300. Then step 650 has the order entry program 312 in the host B at computer 300 using the customer, item and quantity data from the order menu "01" to place the order, adjust inventory records, and initiate the billing.

The host access table shown in FIG. 27 is the host access table for telephone order entry which uses the caller data base manager on the terminal session A and the order entry program on the terminal session B.

In an alternate embodiment of the invention, dialed number identification service (DNIS) information can be provided from the PBX 120 in FIG. 2 through the gateway 118 and over the token ring local area network 116 to the workstation 100. In an application where there are several public telephone lines 122 having different dialed numbers coming into the PBX 120, each respective incoming telephone line 122 may correspond to a different line of business for the user. In order to accommodate the different dialogs with a calling customer, an agent at a workstation 100 can have available a different script displayed on the workstation 100 for each different public switched telephone line number which has been called. For example, if a sales organization has a first line of business of selling cars and a second line of business of selling trucks, and two different public switched telephone numbers are provided to the PBX 120, when a call comes into the PBX on the telephone line related to automobile sales, in accordance with the invention, the automobile sales dialog script will be displayed on the workstation 100 for the agent receiving the call. That same agent may receive the next call from the public switched telephone line corresponding to truck sales and in accordance with the invention, the agent at the workstation 100 will have a dialog script displayed on its workstation corresponding to truck sales. This is achieved by transferring the DNIS data from the PBX 120 over the local area network 116 to the workstation 100 and the DNIS data will invoke either a first host access table 132 corresponding to the first telephone line for automobile sales or it will invoke a second host access table 132' corresponding to truck sales, depending upon the value of the DNIS data received. The first HAT 132 related to automobile sales will interact with the host computer 200 in FIG. 2 to obtain from the host computer the dialog script for automobile sales. The second HAT 132 related to truck sales, will access the second dialog script from either host 200 or host 300. Alternately, a single host access table 132 can control the accessing of either a first dialog script for automobile sales or a second dialog script for truck sales from the host computer 200, based upon the value of the DNIS data received from the PBX 120. The functioning of the system shown in FIG. 2 using DNIS data uses the same principle as that described above for the system using ANI data. The system meets the objective of displaying at the workstation, data related to the calling party or the telephone number dialed by the calling party, at substantially the same time that the telephone rings at the workstation. Alternately, Information Services Distribution Network (ISDN) data can be substituted for the ANI or DNIS data.

Features of the invention include the host access table and the host interface program which operate together to provide a flexible method for operating host based application programs from an intelligent workstation running in terminal emulation mode connected to the host computer, enabling customized modification and combination of the applications without reprogramming of the software on the host computer. An additional feature of the invention is the provision of a navigation table method for automatically navigating through complex sequences of menus in a host based application, from a workstation connected to the host computer.

Although a specific embodiment of the invention has been disclosed, it will be understood by those having skill in the art that changes can be made to that specific embodiment without departing from the spirit and the scope of the invention.

What is claimed is:

1. In a system including a workstation coupled to a telephone network for receiving caller identification data and coupled to a host computer running a menu driven host application program which exchanges menu images with the workstation, the menus containing fields for buffering operands to be processed by the host application program, the operands derived from the caller identification data, a subsystem for providing a programmable interface between the host based application program and the telephone network to automatically transfer the operands from the telephone network to the host application program, comprising:

a host access table stored in a memory in the workstation, containing programmable commands;

an interface program stored in said workstation memory which executes said commands in said host access table, to perform interfacing functions between the host application program and the telephone network;

a first window partition in said workstation memory for buffering communicated menu images transmitted from said host application program;

verify means in said interface program for checking the identity of a first menu buffered in said first window, in response to a verify command in said host access table;

put data means in said interface program for inserting an operand derived from the caller identification data received from said telephone network into a predefined location in said first menu buffered in said first window, in response to a put command in said host access table;

sendkey means in said interface program for transmitting to said host computer at least a portion of said first menu from said first window, in response to a sendkey command in said host access table;

said first window in said workstation memory receiving a second menu communicated from said host application program in said host computer, including response data in a predefined location in said second menu which is responsive to said operand derived from said caller identification data;

get data means in said interface program for extracting said response data at said predefined location in said second menu in said first window, in response to a get command in said host access table;

whereby, a programmable interface is provided between the host based application program and the telephone network to automatically transfer operands from the telephone network to the host application program.

2. In a system including a workstation coupled to a telephone network for receiving caller identification data and coupled to a host computer running a menu driven host application program which exchanges menu images with the workstation, the menus containing fields for buffering operands to be processed by the host application program, the operands derived from the caller identification data, a subsystem for providing a programmable interface between the host based application program and the telephone network to automatically transfer the operands from the telephone network to the host application program, comprising:

a host access table stored in a memory in the workstation, containing programmable commands;

an interface program stored in said workstation memory which executes said commands in said host access table, to perform interfacing functions between the host application program and the telephone network;

a first window partition in said workstation memory for buffering communicated menu images transmitted from said host application program;

verify means in said interface program for checking that the identity of a first menu buffered in said first window is that of a predefined menu, in response to a verify command in said host access table;

a navigation table stored in said memory in the workstation, containing a sequence of selection key indicators for a sequence of selection keys which said host application program requires to move from said first menu to said predefined menu;

menu navigation means in said interface program for moving said predefined menu into said first window, using said sequence of selection key indicators in said navigation table;

put data means in said interface program for inserting an operand derived from the caller identification data received from said telephone network into a predefined location in said predefined menu buffered in said first window, in response to a put command in said host access table;

sendkey means in said interface program for transmitting to said host computer at least a portion of said predefined menu from said first window, in response to a sendkey command in said host access table;

said first window in said workstation memory receiving a second menu communicated from said host application program in said host computer, including response data in a predefined location in said second menu which is responsive to said operand derived from said caller identification data;

get data means in said interface program for extracting said response data at said predefined location in said second menu in said first window, in response to a get command in said host access table;

whereby, a programmable interface is provided between the host based application program and the telephone network to automatically transfer operands from the telephone network in a predefined menu to the host application program.

3. In a system including a workstation coupled to a telephone network for receiving caller identification data and coupled to a first host computer running a first menu driven host application program which exchanges menu images with the workstation, the menus containing fields for buffering first operands to be processed by the first host application program, the operands derived from the caller identification data, the workstation also coupled to a second host computer running a second menu driven host application program which exchanges menu images with the workstation, the menus containing fields for buffering second operands to be processed by the second host application program, the operands derived from the first host application program, a subsystem for providing a programmable interface between the first host based application program and the telephone network to automatically transfer the first operands from the telephone network to the first host application program and between the first host application program and the second host application program to automatically transfer the second operands to the second host application program, comprising:

a host access table stored in a memory in the workstation, containing programmable commands;

an interface program stored in said workstation memory which executes said commands in said host access table, for performing interfacing functions between the first host application program and the telephone network and for performing interfacing functions between the first host application program and the second host application program;

a first window partition in said workstation memory for buffering communicated menu images transmitted from said first host application program;

a second window partition in said workstation memory for buffering communicated menu images transmitted from said second host application program;

verify means in said interface program for checking that the identity of a first menu buffered in said first window is that of a predefined menu, in response to a verify command in said host access table;

a navigation table stored in said memory in the workstation, containing a sequence of selection key indicators for a sequence of selection keys which said first host application program requires to move from said first menu to said predefined menu;

menu navigation means in said interface program for moving said predefined menu into said first window, using said sequence of selection key indicators in said navigation table;

put data means in said interface program for inserting an operand derived from the caller identification data received from said telephone network into a predefined location in said predefined menu buffered in said first window, in response to a put command in said host access table;

sendkey means in said interface program for transmitting to said first host computer at least a portion of said predefined menu from said first window, in response to a sendkey command in said host access table;

said first window in said workstation memory receiving a second menu communicated from said first host application program, including response data in a predefined location in said second menu which is responsive to said operand derived from said caller identification data;

get data means in said interface program for extracting said response data at said predefined location in said second menu in said first window, in response to a get command in said host access table;

session means in said interface program to select said second window which is buffering a third menu transmitted from said second host application program, in response to a setsession command in said host access table;

said put data means in said interface program inserting a second operand derived from said response data from said first host application program, into a predefined location in said third menu buffered in said second window, in response to a put command in said host access table;

said sendkey means in said interface program transmitting to said second host computer at least a portion of said third menu from said second window, in response to a sendkey command in said host access table;

whereby a programmable interface is provided between the first host based application program and the telephone network to automatically transfer the first operands from the telephone network to the first host application program and between the first host application program and the second host application program to automatically transfer the second operands to the second host application program.

4. In a system including a workstation coupled to a telephone network for receiving caller identification data and coupled to a host computer running a menu driven host application program which exchanges menu images with the workstation, the menus containing fields for buffering operands to be processed by the host application program, the operands derived from the caller identification data, a method for providing a programmable interface between the host based application program and the telephone network to automatically transfer the operands from the telephone network to the host application program, comprising the steps of:

storing a host access table in a memory in the workstation, containing programmable commands;

storing an interface program in said workstation memory which executes said commands in said host access table, to perform interfacing functions between the host application program and the telephone network;

buffering communicated menu images transmitted from said host application program, in a first window partition in said workstation memory;

checking the identity of a first menu buffered in said first window, using a verify means in said interface program in response to a verify command in said host access table;

inserting an operand derived from the caller identification data received from said telephone network into a predefined location in said first menu buffered in said first window, using a put data means in said interface program in response to a put command in said host access table;

transmitting to said host computer at least a portion of said first menu from said first window, using a sendkey means in said interface program in response to a sendkey command in said host access table;

said first window in said workstation memory receiving a second menu communicated from said host application program in said host computer, including response data in a predefined location in said second menu which is responsive to said operand derived from said caller identification data;

extracting said response data at said predefined location in said second menu in said first window, using a get data means in said interface program in response to a get command in said host access table;

whereby, a programmable interface is provided between the host based application program and the telephone network to automatically transfer operands from the telephone network to the host application program.

5. In a system including a workstation coupled to a telephone network for receiving caller identification data and coupled to a host computer running a menu driven host application program which exchanges menu images with the workstation, the menus containing fields for buffering operands to be processed by the host application program, the operands derived from the caller identification data, a method for providing a programmable interface between the host based application program and the telephone network to automatically transfer the operands from the telephone network to the host application program, comprising the steps of:

storing a host access table in a memory in the workstation, containing programmable commands;

storing an interface program in said workstation memory which executes said commands in said host access table, to perform interfacing functions between the host application program and the telephone network;

buffering communicated menu images transmitted from said host application program, in a first window partition in said workstation memory;

checking that the identity of a first menu buffered in said first window is that of a predefined menu, using a verify means in said interface program in response to a verify command in said host access table;

storing a navigation table in said memory in the workstation, containing a sequence of selection key indicators for a sequence of selection keys which said host application program requires to move from said first menu to said predefined menu;

moving said predefined menu into said first window, using a menu navigation means in said interface program operating with said sequence of selection key indicators in said navigation table;

inserting an operand derived from the caller identification data received from said telephone network into a predefined location in said predefined menu buffered in said first window, using a put data means in said interface program in response to a put command in said host access table;

transmitting to said host computer at least a portion of said predefined menu from said first window, using a sendkey means in said interface program in response to a sendkey command in said host access table;

said first window in said workstation memory receiving a second menu communicated from said host application program in said host computer, including response data in a predefined location in said second menu which is responsive to said operand derived from said caller identification data;

extracting said response data at said predefined location in said second menu in said first window, using a get data means in said interface program in response to a get command in said host access table;

whereby, a programmable interface is provided between the host based application program and the telephone network to automatically transfer operands from the telephone network in a predefined menu to the host application program.

6. In a system including a workstation coupled to a telephone network for receiving dialed number identification service (DNIS) data and coupled to a host computer running a menu driven host application program which exchanges menu images with the workstation, the menus containing fields for buffering operands to be processed by the host application program, the operands derived from the DNIS data, a subsystem for providing a programmable interface between the host based application program and the telephone network to automatically transfer the operands from the telephone network to the host application program, comprising:

a host access table stored in a memory in the workstation, containing programmable commands;

an interface program stored in said workstation memory which executes said commands in said host access table, to perform interfacing functions between the host application program and the telephone network;

a first window partition in said workstation memory for buffering communicated menu images transmitted from said host application program;

verify means in said interface program for checking the identity of a first menu buffered in said first window, in response to a verify command in said host access table;

put data means in said interface program for inserting an operand derived from the DNIS data received from said telephone network into a predefined location in said first menu buffered in said first window, in response to a put command in said host access table;

sendkey means in said interface program for transmitting to said host computer at least a portion of said first menu from said first window, in response to a sendkey command in said host access table;

said first window in said workstation memory receiving a second menu communicated from said host application program in said host computer, including response data in a predefined location in said second menu which is responsive to said operand derived from said DNIS data;

get data means in said interface program for extracting said response data at said predefined location in said second menu in said first window, in response to a get command in said host access table;

whereby, a programmable interface is provided between the host based application program and the telephone network to automatically transfer operands from the telephone network to the host application program.

7. In a system including a workstation coupled to a telephone network for dialed number identification service (DNIS) data and coupled to a host computer running a menu driven // host application program which exchanges menu images with the workstation, the menus containing fields for buffering operands to be processed by the host application program, the operands derived from the DNIS data, a method for providing a programmable interface between the host based application program and the telephone network to automatically transfer the operands from the telephone network to the host application program, comprising the steps of:

storing a host access table in a memory in the workstation, containing programmable commands;

storing an interface program in said workstation memory which executes said commands in said host access table, to perform interfacing functions between the host application program and the telephone network;

buffering communicated menu images transmitted from said host application program, in a first window partition in said workstation memory;

checking the identity of a first menu buffered in said first window, using a verify means in said interface program in response to a verify command in said host access table;

inserting an operand derived from the DNIS data received from said telephone network into a predefined location in said first menu buffered in said first window, using a put data means in said interface program in response to a put command in said host access table;

transmitting to said host computer at least a portion of said first menu from said first window, using a sendkey means in said interface program in response to a sendkey command in said host access table;

said first window in said workstation memory receiving a second menu communicated from said host application program in said host computer, including response data in a predefined location in said second menu which is responsive to said operand derived from said DNIS data;

extracting said response data at said predefined location in said second menu in said first window, using a get data means in said interface program in response to a get command in said host access table;

whereby, a programmable interface is provided between the host based application program and the telephone network to automatically transfer operands from the telephone network to the host application program.

8. In a system including a workstation coupled to a telephone network for receiving call identification data and coupled to a host computer running an application program which exchanges menu images with the workstation, the menus containing fields for buffering operands to be processed by the host application program, the operands derived from the call identification data, a subsystem for providing a programmable interface between the host based application program and the telephone network to automatically transfer the operands from the telephone network to the host application program, comprising:

a host access table stored in a memory in the workstation, containing programmable commands;

an interface program stored in said workstation memory which executes said commands in said host access table, to perform interfacing functions between the host application program and the telephone network;

a first window partition in said workstation memory for buffering communicated menu images transmitted from said host application program;

put data means in said interface program for inserting an operand derived from the call identification data received from said telephone network into a predefined location in a first menu buffered in said first window, in response to a put command in said host access table;

sendkey means in said interface program for transmitting to said host computer at least a portion of said first menu from said first window, in response to a sendkey command in said host access table;

said first window in said workstation memory receiving a second menu communicated from said host application program in said host computer, including response data in a location in said second menu which is responsive to said operand derived from said call identification data;

get data means in said interface program for extracting
said response data at said location in said second menu in said first window, in response to a get command in said host access table;

whereby, a programmable interface is provided between the host based application program and the telephone network to automatically transfer operands from the telephone network to the host application program.

9. The system of claim 8, wherein said call identification data is Automatic Number Identification (ANI) data.

10. The system of claim 8, wherein said call identification data is Dialed Number Identification Service (DNIS) data.

11. The system of claim 8, wherein said call identification data is Automatic Number Identification (ANI) data and Dialed Number Identification Service (DNIS) data.

12. In a system including a workstation coupled to a telephone network for receiving call identification data and coupled to a host computer running an application program which exchanges menu images with the workstation, the menus containing fields for buffering operands to be processed by the host application program, the operands derived from the call identification data, a subsystem for providing a programmable interface between the host based application program and the telephone network to automatically transfer the operands from the telephone network to the host application program, comprising:

a host access table stored in a memory in the workstation, containing programmable commands;

an interface program stored in said workstation memory which executes said commands in said host access table, to perform interfacing functions between the host application program and the telephone network;

a first window partition in said workstation memory for buffering communicated menu images transmitted from said host application program;

verify means in said interface program for checking that the identity of a first menu buffered in said first window is that of a predefined menu, in response to a verify command in said host access table;

a navigation table stored in said memory in the workstation, containing a sequence of selection key indicators for a sequence of selection keys which said host application program requires to move from said first menu to said predefined menu;

menu navigation means in said interface program for moving said predefined menu into said first window, using said sequence of selection key indicators in said navigation table;

put data means in said interface program for inserting an operand derived from the caller identification data received from said telephone network into a location in said predefined menu buffered in said first window, in response to a put command in said host access table;

sendkey means in said interface program for transmitting to said host computer at least a portion of said predefined menu from said first window, in response to a sendkey command in said host access table;

whereby, a programmable interface is provided between the host based application program and the telephone network to automatically transfer operands from the telephone network in a predefined menu to the host application program.

13. The system of claim 12, wherein said call identification data is Automatic Number Identification (ANI) data.

14. The system of claim 12, wherein said call identification data is Dialed Number Identification Service (DNIS) data.

15. The system of claim 12, wherein said call identification data is Automatic Number Identification (ANI) data and Dialed Number Identification Service (DNIS) data.

16. In a system including a workstation coupled to a telephone network for receiving call identification data and coupled to a host computer running a host application program which exchanges menu images with the workstation, the menus containing fields for buffering operands to be processed by the host application program, the operands derived from the call identification data, a method for providing a programmable interface between the host based application program and the telephone network to automatically transfer the operands from the telephone network to the host application program, comprising the steps of:
- storing a host access table in a memory in the workstation, containing programmable commands;
- storing an interface program in said workstation memory which executes said commands in said host access table, to perform interfacing functions between the host application program and the telephone network;
- buffering communicated menu images transmitted from said host application program, in a window partition in said workstation memory;
- inserting an operand derived from the call identification data received from said telephone network into a location in a first menu buffered in said window, using a put data means in said interface program in response to a put command in said host access table;
- transmitting to said host computer at least a portion of said first menu from said window, using a sendkey means in said interface program in response to a sendkey command in said host access table;
- said window in said workstation memory receiving a second menu communicated from said host application program in said host computer, including response data in a location in said second menu which is responsive to said operand derived from said call identification data;
- extracting said response data in said second menu in said window, using a get data means in said interface program in response to a get command in said host access table;
- whereby, a programmable interface is provided between the host based application program and the telephone network to automatically transfer operands from the telephone network to the host application program.

17. The method of claim 16, wherein said call identification data is Automatic Number Identification (ANI) data.

18. The method of claim 16, wherein said call identification data is Dialed Number Identification Service (DNIS) data.

19. The method of claim 16, wherein said call identification data is Automatic Number Identification (ANI) data and Dialed Number Identification Service (DNIS) data.

20. In a system including a workstation coupled to a telephone network for receiving call identification data and coupled to a host computer running a host application program which exchanges menu images with the workstation, the menus containing fields for buffering operands to be processed by the host application program, the operands derived from the call identification data, a method for providing a programmable interface between the host based application program and the telephone network to automatically transfer the operands from the telephone network to the host application program, comprising the steps of:
- storing a host access table in a memory in the workstation, containing programmable commands;
- storing an interface program in said workstation memory which executes said commands in said host access table, to perform interfacing functions between the host application program and the telephone network;
- buffering communicated menu images transmitted from said host application program, in a window partition in said workstation memory;
- checking that the identity of a first menu buffered in said window is that of a predefined menu, using a verify means in said interface program in response to a verify command in said host access table;
- storing a navigation table in said memory in the workstation, containing a sequence of selection key indicators for a sequence of selection keys which said host application program requires to move from said first menu to said predefined menu;
- moving said predefined menu into said window, using a menu navigation means in said interface program operating with said sequence of selection key indicators in said navigation table;
- inserting an operand derived from the call identification data received from said telephone network into a location in said predefined menu buffered in said window, using a put data means in said interface program in response to a put command in said host access table;
- transmitting to said host computer at least a portion of said predefined menu from said window, using a sendkey means in said interface program in response to a sendkey command in said host access table;
- whereby, a programmable interface is provided between the host based application program and the telephone network to automatically transfer operands from the telephone network in a predefined menu to the host application program.

21. The method of claim 20, wherein said call identification data is Automatic Number Identification (ANI) data.

22. The method of claim 20, wherein said call identification data is Dialed Number Identification Service (DNIS) data.

23. The method of claim 20, wherein said call identification data is Automatic Number Identification (ANI) data and Dialed Number Identification Service (DNIS) data.

24. In a system including a workstation coupled to a telephone network for receiving call identification data and coupled to a host computer running an application program which exchanges menu images with the workstation, the menus containing fields for buffering operands to be processed by the host application program, the operands derived from the call identification data, a subsystem for providing a programmable interface between the host based application program and the telephone network to automatically conduct transactions between the telephone network and the host application program, comprising:
- a host access table stored in a memory in the workstation, containing programmable commands;
- an interface program stored in said workstation memory which executes said commands in said host access table, to perform interfacing functions between the host application program and the telephone network;
- a first window partition in said workstation memory for buffering communicated menu images transmitted from said host application program; put data means in said interface program for inserting an operand derived from the call identification data received from said telephone network into a predefined location in a first menu buffered in said first window, in response to a put command in said host access table;
- sendkey means in said interface program for transmitting to said host computer at least a portion of said first menu from said first window, in response to a sendkey command in said host access table;
- said first window in said workstation memory receiving a second menu communicated from said host application program in said host computer, including response data in a location in said second menu which is responsive to said operand derived from said call identification data;
- get data means in said interface program for extracting said response data at said location in said second menu in said first window, in response to a get command in said host access table;
- a voice response unit coupled to said workstation and coupled to said telephone network, for converting said response data into a sound signal for transmission to said telephone network;
- whereby, a programmable interface is provided between the host based application program and the telephone network to automatically conduct transactions between the network and the host application program.

25. The system of claim 24, wherein said workstation conducts said transactions without the intervention of an operator agent.

26. The system of claim 24, wherein said call identification data is Automatic Number Identification (ANI) data.

27. The system of claim 24, wherein said call identification data is Dialed Number Identification Service (DNIS) data.

28. The system of claim 24, wherein said sound signal is a DTMF tone.

29. The system of claim 24, wherein said sound signal is a voice sound.

30. In a system including a workstation coupled to a telephone network for receiving call identification data and coupled to a host computer running an application program which exchanges menu images with the workstation, the menus containing fields for buffering operands to be processed by the host application program, the operands derived from the call identification data, a subsystem for providing a programmable interface between the host based application program and the telephone network to automatically conduct transactions between the telephone network and the host application program, comprising:
- a host access table stored in a memory in the workstation, containing programmable commands;
- an interface program stored in said workstation memory which executes said commands in said host access table, to perform interfacing functions between the host application program and the telephone network;
- a first window partition in said workstation memory for buffering communicated menu images transmitted from said host application program;
- verify means in said interface program for checking that the identity of a first menu buffered in said first window is that of a predefined menu, in response to a verify command in said host access table;
- a navigation table stored in said memory in the workstation, containing a sequence of selection key indicators for a sequence of selection keys which said host application program requires to move from said first menu to said predefined menu;
- menu navigation means in said interface program for moving said predefined menu into said first window, using said sequence of selection key indicators in said navigation table;
- put data means in said interface program for inserting an operand derived from the caller identification data received from said telephone network into a location in said predefined menu buffered in said first window, in response to a put command in said host access table;
- sendkey means in said interface program for transmitting to said host computer at least a portion of said predefined menu from said first window, in response to a sendkey command in said host access table;
- said first window in said workstation memory receiving a second menu communicated from said host application program in said host computer, including response data in a location in said second menu which is responsive to said operand derived from said call identification data;
- get data means in said interface program for extracting said response data at said location in said second menu in said first window, in response to a get command in said host access table;
- a voice response unit coupled to said workstation and coupled to said telephone network, for converting said response data into a sound signal for transmission to said telephone network;
- whereby, a programmable interface is provided between the host based application program and the telephone network to automatically conduct transactions between the network and the host application program.

31. The system of claim 30, wherein said workstation conducts said transactions without the intervention of an operator agent.

32. The system of claim 30, wherein said call identification data is Automatic Number Identification (ANI) data.

33. The system of claim 30, wherein said call identification data is Dialed Number Identification Service (DNIS) data.

34. The system of claim 30, wherein said sound signal is a DTMF tone.

35. The system of claim 30, wherein said sound signal is a voice sound.

36. A system, comprising:
- a workstation coupled to a telephone network for receiving call identification data;

a host computer coupled to said workstation, for running an application program which exchanges menu images with said workstation, said menus containing fields for buffering operands to be processed by said host application program, said operands derived from said call identification data;

a host access table stored in a memory in the workstation, containing programmable commands;

an interface program stored in said workstation memory which executes said commands in said host access table, to perform interfacing functions between the host application program and the telephone network;

a first window partition in said workstation memory for buffering communicated menu images transmitted from said host application program;

put data means in said interface program for inserting an operand derived from the call identification data received from said telephone network into a location in a first menu buffered in said first window, in response to a put command in said host access table;

sendkey means in said interface program for transmitting to said host computer at least a portion of said first menu from said first window, in response to a sendkey command in said host access table;

said first window in said workstation memory receiving a second menu communicated from said host application program in said host computer, including response data in a location in said second menu which is responsive to said operand derived from said call identification data;

get data means in said interface program for extracting said response data at said location in said second menu in said first window, in response to a get command in said host access table;

whereby, a programmable interface is provided between the host based application program and the telephone network to automatically transfer operands from the telephone network to the host application program.

37. The system of claim 36, wherein said call identification data is Automatic Number Identification (ANI) data.

38. The system of claim 36, wherein said call identification data is Dialed Number Identification Service (DNIS) data.

39. The system of claim 36, wherein said call identification data is Information Services Distribution Network (ISDN) data.

40. The system of claim 36, which further comprises:
a voice response unit coupled to said workstation and coupled to said telephone network, for converting said response data into a sound signal for transmission to said telephone network.

41. The system of claim 40, wherein said workstation conducts said transactions without the intervention of an operator agent.

42. The system of claim 40, wherein said sound signal is a DTMF tone.

43. The system of claim 40, wherein said sound signal is a voice sound signal.

44. The system of claim 36, which further comprises:
a private branch exchange (PBX) coupled between said workstation and said telephone network, for switching said call identification data between said network and said workstation.

45. The system of claim 44, which further comprises:
a voice response unit coupled to said workstation and coupled to said PBX, for converting said response data into a sound signal for transmission to said telephone network through said PBX;
said PBX switching said sound signal between said voice response unit and said network.

46. The system of claim 44, wherein said call identification data is Automatic Number Identification (ANI) data.

47. The system of claim 44, wherein said call identification data is Dialed Number Identification Service (DNIS) data.

48. The system of claim 44, wherein said call identification data is Information Services Distribution Network (ISDN) data.

49. A system, comprising:
a workstation coupled to a telephone network for receiving call identification data;

a host computer coupled to said workstation, for running an application program which exchanges menu images with said workstation, said menus containing fields for buffering operands to be processed by said host application program, said operands derived from said call identification data;

a host access table stored in a memory in said workstation, containing programmable commands;

an interface program stored in said workstation memory which executes said commands in said host access table, to perform interfacing functions between said host application program and the telephone network;

a first window partition in said workstation memory for buffering communicated menu images transmitted from said host application program;

verify means in said interface program for checking that the identity of a first menu buffered in said first window is that of a predefined menu, in response to a verify command in said host access table;

a navigation table stored in said memory in the workstation, containing a sequence of selection key indicators for a sequence of selection keys which said host application program requires to move from said first menu to said predefined menu;

menu navigation means in said interface program for moving said predefined menu into said first window, using said sequence of selection key indicators in said navigation table;

put data means in said interface program for inserting an operand derived from the caller identification data received from said telephone network into a location in said predefined menu buffered in said first window, in response to a put command in said host access table;

sendkey means in said interface program for transmitting to said host computer at least a portion of said predefined menu from said first window, in response to a sendkey command in said host access table;

whereby, a programmable interface is provided between the host based application program and the telephone network to automatically transfer operands from the telephone network in a predefined menu to the host application program.

50. The system of claim 49, wherein said call identification data is Automatic Number Identification (ANI) data.

51. The system of claim 49, wherein said call identification data is Dialed Number Identification Service (DNIS) data.

52. The system of claim 49, wherein said call identification data is Information Services Distribution Network (ISDN) data.

53. The system of claim 49, which further comprises:
said first window in said workstation memory receiving a second menu communicated from said host application program in said host computer, including response data in a location in said second menu which is responsive to said operand derived from said call identification data;
get data means in said interface program for extracting said response data at said location in said second menu in said first window, in response to a get command in said host access table.

54. The system of claim 53, which further comprises:
a voice response unit coupled to said workstation and coupled to said telephone network, for converting said response data into a sound signal for transmission to said telephone network.

55. The system of claim 54, wherein said workstation conducts said transactions without the intervention of an operator agent.

56. The system of claim 54, wherein said sound signal is a DTMF tone.

57. The system of claim 54, wherein said sound signal is a voice sound signal.

58. The system of claim 49, which further comprises:
a private branch exchange (PBX) coupled between said workstation and said telephone network, for switching said call identification data between said network and said workstation.

59. The system of claim 58, wherein said call identification data is Automatic Number Identification (ANI) data.

60. The system of claim 58, wherein said call identification data is Dialed Number Identification Service (DNIS) data.

61. The system of claim 58, wherein said call identification data is Information Services Distribution Network (ISDN) data.

62. The system of claim 53, which further comprises:
a private branch exchange (PBX) coupled between said workstation and said telephone network, for switching said call identification data between said network and said workstation.

63. The system of claim 62, which further comprises:
a voice response unit coupled to said workstation and coupled to said PBX, for converting said response data into a sound signal for transmission to said telephone network through said PBX;
said PBX switching said sound signal between said voice response unit and said network.

64. The system of claim 63, wherein said workstation conducts said transactions without the intervention of an operator agent.

65. An interactive memory driven program for enhancing operations of a telephone call center including one or more host computers interacting with one or more workstations connected to a telephone network which provides caller identification information, comprising:
(a) a verify means for checking the identity of a first menu buffered in the workstation;
(b) a navigation means for moving the first menu into a first window partition in said workstation;
(c) a put data means for inserting an operand derived from caller identification information, into the first menu;
(d) a sendkey means for transmitting a portion of the first menu to the host computer;
(e) said host computer providing a second menu to the workstation response to the operand; and
(f) a get data means for extracting response data in said second menu received from said host computer.

* * * * *